United States Patent
Matsuno et al.

(10) Patent No.: US 8,446,434 B2
(45) Date of Patent: May 21, 2013

(54) IMAGE PROCESSOR

(75) Inventors: Tetsuro Matsuno, Aichi-ken (JP); Koji Akagi, Aichi-ken (JP); Tatsuya Sato, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1351 days.

(21) Appl. No.: 12/153,642

(22) Filed: May 22, 2008

(65) Prior Publication Data

US 2008/0297536 A1    Dec. 4, 2008

(30) Foreign Application Priority Data

May 30, 2007    (JP) ................................ P2007-144032

(51) Int. Cl.
G09G 5/00    (2006.01)

(52) U.S. Cl.
USPC ............................ 345/684; 345/682; 345/672

(58) Field of Classification Search
USPC ........................................................ 345/684
See application file for complete search history.

(56) References Cited

U.S. PATENT DOCUMENTS

| | | | | |
|---|---|---|---|---|
| 5,903,267 A * | 5/1999 | Fisher | ............................ | 715/786 |
| 7,430,008 B2 * | 9/2008 | Ambiru et al. | ............ | 348/333.12 |
| 7,752,573 B2 * | 7/2010 | Shiba et al. | .................... | 715/835 |
| 8,006,276 B2 * | 8/2011 | Nakagawa et al. | ............ | 725/105 |
| 2005/0219665 A1 * | 10/2005 | Mino | ............................ | 358/537 |

FOREIGN PATENT DOCUMENTS

| | | |
|---|---|---|
| JP | 6-251061 | 9/1994 |
| JP | 2000-082048 A | 3/2000 |
| JP | 2001-075701 A | 3/2001 |
| JP | 2004-139321 | 5/2004 |
| JP | 2005-300933 | 10/2005 |

OTHER PUBLICATIONS

Japan Patent Office, Office Action for Japanese Patent Application No. 2007-144032, mailed Sep. 27, 2011.

* cited by examiner

*Primary Examiner* — Joni Richer
(74) *Attorney, Agent, or Firm* — Baker Botts L.L.P.

(57) ABSTRACT

An image processor enabling a user to quickly select desired images from a large number of images without scrolling repeatedly through the images. The image processor assigns image numbers to segments of a scroll bar and displays image data corresponding to an image number assigned at the position on the scroll bar pressed by the user. The image processor also reduces the number of image numbers assigned per segment of the scroll bar near the image number at the pressed position on the scroll bar to facilitate the user in specifying a desired image through a subsequent input operation.

8 Claims, 15 Drawing Sheets

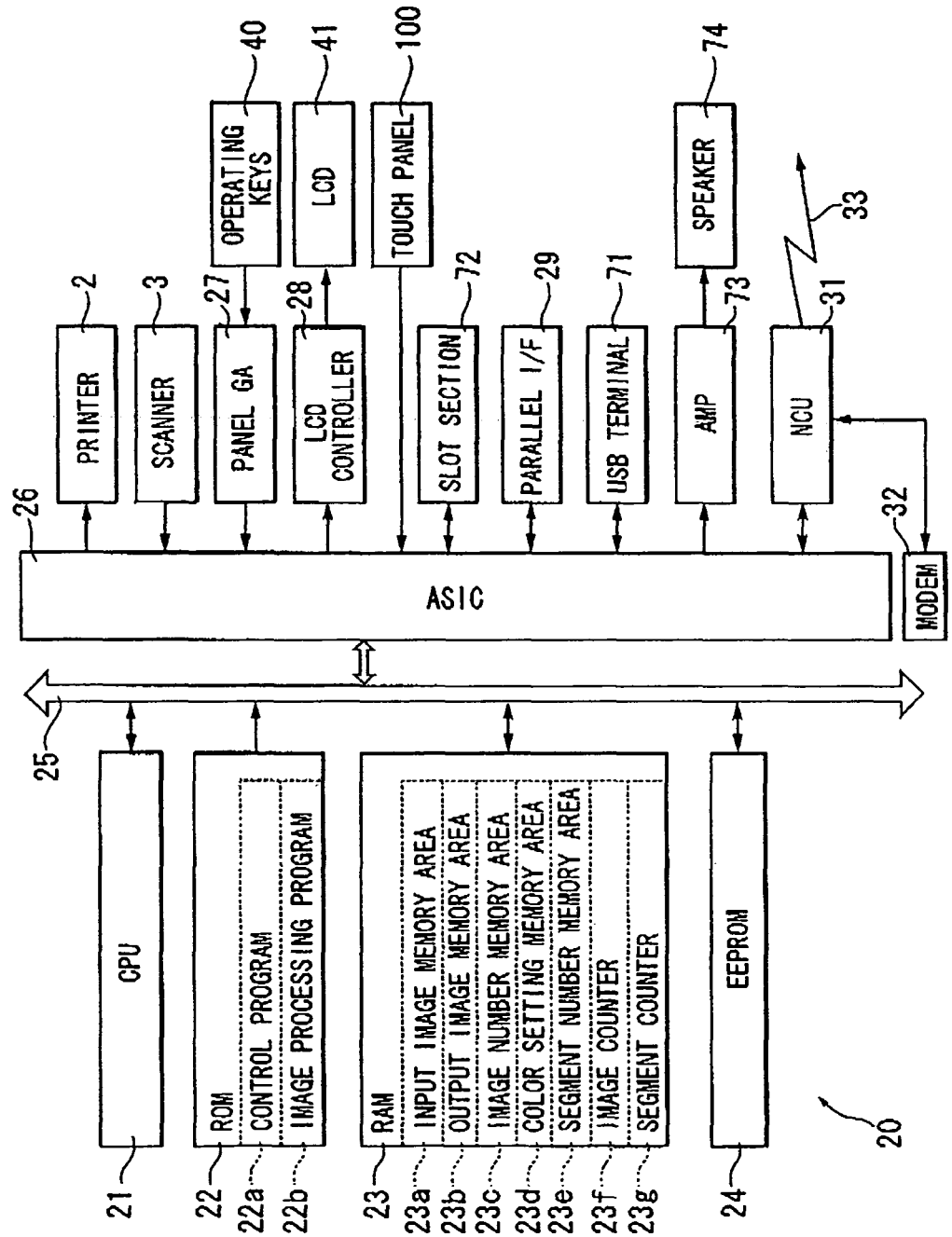

| SEGMENT COUNT | SEGMENT NAME | IMAGE NUMBERS IN SEGMENT |
|---|---|---|
| 1 | A | 1~100 |
| 2 | B | 101~200 |
| 3 | C | 201~300 |
| 4 | D | 301~400 |
| 5 | E | 401~500 |
| 6 | F | 501~600 |
| 7 | G | 601~700 |
| 8 | H | 701~800 |
| 9 | I | 801~900 |
| 10 | J | 901~1000 |

| SEGMENT COUNT | SEGMENT NAME | IMAGE NUMBERS IN SEGMENT |
|---|---|---|
| 1 | A | 1~90 |
| 2 | B | 91~180 |
| 3 | C | 181~220 |
| 4 | D | 221~230 |
| 5 | E | 231~240 |
| 6 | F | 241~250 |
| 7 | G | 251~260 |
| 8 | H | 261~300 |
| 9 | I | 301~650 |
| 10 | J | 651~1000 |

IMAGE PROCESSOR

CROSS REFERENCE TO RELATED APPLICATIONS

This application claims priority from Japanese Patent Application No. 2007-144032 filed May 30, 2007. The entire content of the priority application is incorporated herein by reference.

TECHNICAL FIELD

The present invention relates to an image processor, and more particularly, to an image processor enabling a user to quickly select a desired image from among a large quantity of images.

BACKGROUND

Various electronic devices display data on a liquid crystal display (hereinafter abbreviated to "LCD") or other displaying means. When the amount of data is large enough that the device cannot display all data on the LCD simultaneously, generally a scrolling operation is enabled by which the user can continuously shift the display position of data forward or backward. In order to simplify this operation, many devices display a scroll bar on the LCD with which the user can adjust the display position of data.

One device using scroll bar operations disclosed in Japanese patent application publication No. HEI-6-251061 provides a slider on the scroll bar displayed on the LCD and displays data based on the position of the slider within the scroll bar. Since the position of the slider within the scroll bar indicates the position of the displayed part within the entire data, the user can readily determine where the data displayed on the LCD fits into the overall range of data. This is advantageous because the user can estimate the position of data that the user wishes to view and can display the desired data relatively quickly by operating the slider to select the data being displayed based on the estimated position.

In an effort to improve user-friendliness, Japanese unexamined patent application publication No. 2004-139321 proposes a scroll bar operation device having a function for displaying data corresponding to a specified position on the scroll bar when the user specifies a position on the scroll bar through an input operation. In this way, the user can display data corresponding to a position on the scroll bar by performing a single operation on the scroll bar, without having to move the slider to the position for displaying the desired data.

However, with the conventional scroll bar device disclosed in Japanese unexamined patent application publication No. HEI-6-251061, if the desired data is not currently displayed on the screen, the user must perform a scrolling operation until the desired data arrives in the display, often requiring the user to scroll for a long period of time (through many screens) until the desired data is displayed. Thus, this device increases the amount of effort the user must put forth to retrieve desired data from the entire set of data.

The scroll bar operation device disclosed in Japanese unexamined patent application publication No. 2004-139321 is provided with a function for displaying data corresponding to a position touched on the scroll bar, thereby reducing the amount of scrolling operations required. However, the scroll bar displayed in one screen does not correspond to all browsable data and, hence, there may exist data that cannot be selected (displayed) using the scroll bar in the current screen. If the scroll bar corresponding to the desired data is not currently displayed, in some cases the user may be required to shift the screen several times before the scroll bar displayed in the screen can be used to select the desired data.

In recent years, facsimile machines, printers, and other devices functioning as image processors have become commonplace. Most of these devices are provided with an LCD for displaying images loaded in the device. Images loaded in these devices may be captured by a digital camera or the like and are often numerous in quantity. Generally, the images are converted to thumbnail images (reduced images created from the original images as samples indicating the content of the image data), and a number of the thumbnail images that can fit in the LCD screen at one time are displayed on the LCD. The user can then select a desired image from the total set of images by sequentially scrolling the thumbnail images displayed on the LCD.

However, since the thumbnail images comprise a larger amount of data than ordinary text data, the time required for processing thumbnail images to be displayed is longer, resulting in waiting time between displays. Consequently, scrolling operations proceed rather slowly and can cause the user great stress. In other words, when the data displayed on the LCD are images, operations for scrolling through or changing the display of images on the screen often place a greater burden on the user.

SUMMARY

In view of the foregoing, it is an object of the present invention to provide an image processor that enables a user to select desired images quickly from among a large number of images.

This and other objects will be attained by an image processor including an image display controlling portion, an image storing portion, a selecting portion, an input receiving portion, an array display controlling portion, a first assigning portion, an identification data managing portion, and an input position determining portion. The image display controlling portion displays images on a display screen. The image storing portion stores a set of images to be displayed on the display screen. The selecting portion selects the images displayed on the display screen. The input receiving portion receives input on the display screen. The array display controlling portion displays an array on the display screen. The array is of a size that fits within the display screen and includes a plurality of segments including a first segment nearest one end of the array and an nth segment nearest the opposite end of the array, with the plurality of segments arranged sequentially from the first segment to the nth segment. The first assigning portion assigns identification data identifying each image in the set of images stored in the image storing portion to specification data specifying each segment of the array displayed by the array display controlling portion based on the order of the identification data. The identification data managing portion manages identification data assigned to specification data by the first assigning means in association with positions in the array. The input position determining portion determines the position of input in the array when the input receiving portion receives input. The image display controlling portion displays on the display screen an image identified by identification data managed by the identification data managing portion in correspondence with the position determined by the input position determining portion, as the images selected by the selecting portion when the input receiving portion receives input. The first assigning portion includes a reduction part that reduces, upon receipt of input by the input receiving portion, the number of identification data assigned to the segment including identification data managed by the identification data managing portion in correspondence with the position determined by the input position determining portion from the number prior to the receipt of the input by the input receiving portion.

In another aspect of the invention, there is provided an image processor including an image display controlling portion, an image storing portion, a selecting portion, an input receiving portion, an array display controlling portion, an input position determining portion, a hierarchy managing portion, and, a group assigning portion. The image display controlling portion displays images on a display screen. The image storing portion stores a set of images to be displayed on the display screen. The selecting portion selects the images displayed on the display screen. The input receiving portion receives input on the display screen. The array display controlling portion displays an array on the display screen. The array is of a size that fits within the display screen and includes a plurality of segments including a first segment nearest one end of the array and an nth segment nearest the opposite end of the array, with the plurality of segments arranged sequentially from the first segment to the nth segment. The input position determining portion determines the position of input in the array when the input receiving portion receives input. The hierarchy managing portion groups identification data identifying each image in the set of images stored in the image storing portion based on common categories of identification data. The hierarchy managing portion also hierarchically manages each group based on the identification data. The group assigning portion assigns segments of the array to each group formed by the hierarchy managing portion. The image display controlling portion displays, on the display screen images, an image belonging to a group that the group assigning portion associates with a segment including the position determined by the input position determining portion, as an image selected by the selecting portion upon receipt of input by the input receiving portion. The array display controlling portion includes hierarchical level displaying part that displays an array corresponding to each hierarchical level on the display screen. The hierarchical level displaying part displays, upon receipt of input by the input receiving portion, an array including identification data managed in a low-order hierarchical level by the hierarchy managing portion for a group that the group assigning portion associates with a segment including the position determined by the input position determining portion.

In still another aspect of the present invention, there is provided an image processor including an image display controlling portion, an image storing portion, a selecting portion, an input receiving portion, an array display controlling portion, a second assigning portion, and an image managing portion. The image display controlling portion displays images on a display screen. The image storing portion stores a set of images to be displayed on the display screen. The selecting portion selects the images displayed on the display screen. The input receiving portion receives input on the display screen. The array display controlling portion displays an array on the display screen. The array is of a size that fits within the display screen and includes a plurality of segments including a first segment nearest one end of the array and an nth segment nearest the opposite end of the array, with the plurality of segments arranged sequentially from the first segment to the nth segment. The second assigning portion assigns each image in the set of images stored in the image storing portion to a segment of the array displayed by the array display controlling portion based on the order of identification data for each image. The image managing portion manages images assigned to each segment by the second assigning portion for each image in the array. The image display controlling portion displays, upon receipt of input by the input receiving portion, on the display screen, images including an image managed by the image managing portion in association with the input position as the image selected by the selecting portion. The second assigning portion reduces, upon receiving an input by the input receiving portion, the number of images assigned to the segment including the image managed by the image managing portion in association with the position determined by the input position determining portion to a number less than the number of images prior to the receipt of the input by the input receiving portion.

BRIEF DESCRIPTION OF THE DRAWINGS

In the drawings:

FIG. 2 is a block diagram showing the electrical structure of the multifunction device;

FIG. 10A-1, FIG. 10A-2, FIG. 10B, FIG. 10C, and FIG. 10D are explanatory diagrams showing the display screen on the LCD during execution of the display selection process;

DETAILED DESCRIPTION

Next, preferred embodiments of the present invention will be described while referring to the accompanying drawings.

Figure 1:
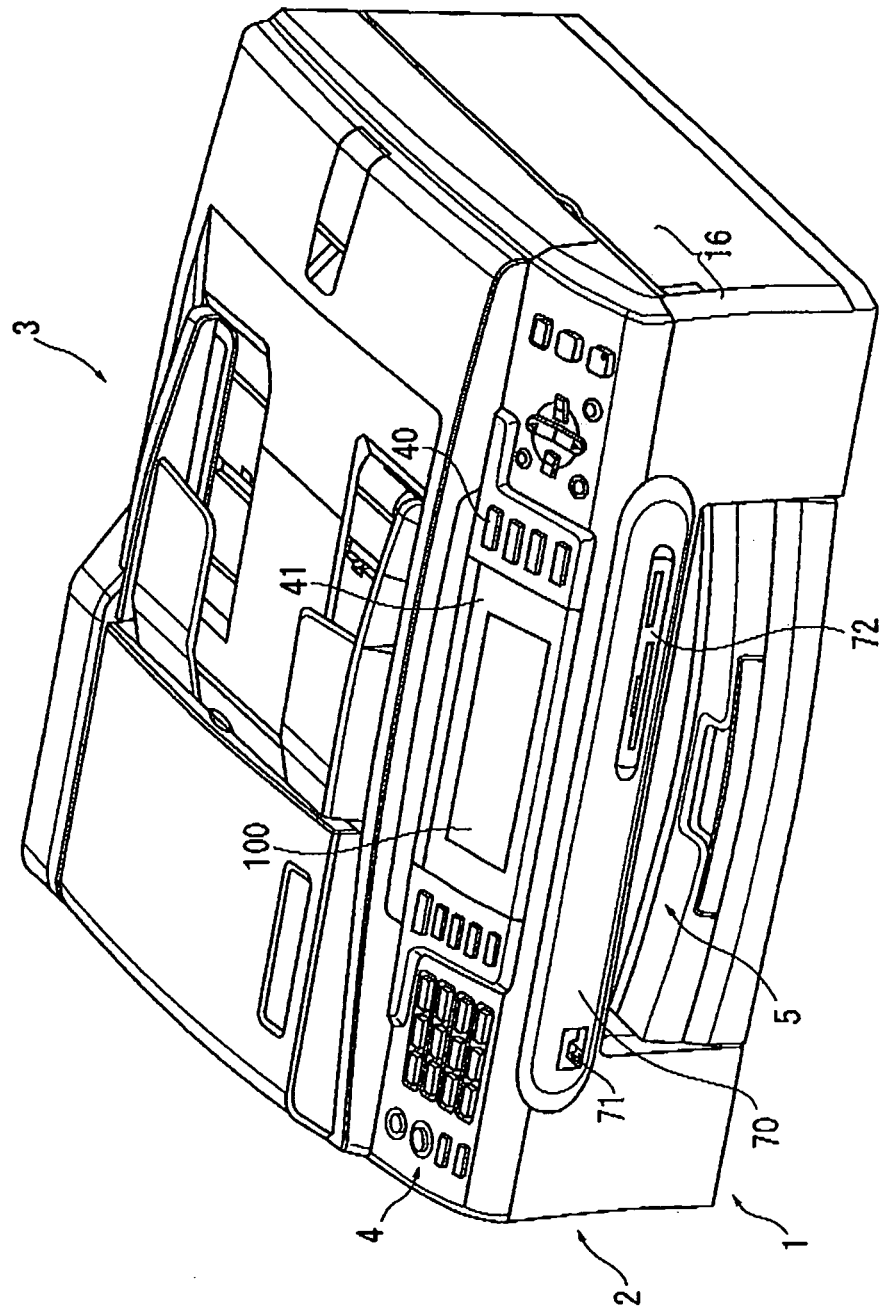
FIG. 1 is a perspective view showing an outer structure of a multifunction device according to a first embodiment of the present invention.

FIG. 1 is a perspective view showing the external structure of a multifunction device 1 according to a first embodiment of the present invention. However, the following embodiment is merely an example of the present invention, and it should be apparent to those skilled in the art that many modifications and variations may be made therein without departing from the spirit of the invention.

As shown in FIG. 1, the multifunction device 1 is a multifunction peripheral (MFP) integrally provided with a printer 2 occupying a lower section thereof, a scanner 3 occupying an upper section thereof, and a control panel 4 disposed on the front surface of the scanner 3. The multifunction device 1 implements a plurality of functions, including a copier function, a facsimile function, and a printer function for recording (printing) data received from an external computer (not shown), such as a personal computer (hereinafter abbreviated to "PC"), on recording paper.

An opening 5 is formed in the front surface of the printer 2. A connection panel 70 is provided in the printer 2 above the opening 5. The connection panel 70 has a USB terminal 71 on the left side thereof. The USB terminal 71 is a connector enabling the multifunction device 1 to be connected to an external device via a USB cable so that the external device and the multifunction device 1 can communicate with each other. The connection panel 70 also has a slot section 72 on the right side thereof. The slot section 72 includes a plurality of card slots in which memory cards can be mounted. A control unit 20 described later (see FIG. 2) can read image data from a memory card mounted in one of the slots.

The front surface side of the printer 2 protrudes forward from the scanner 3 as a protruding part 16. The control panel 4 is provided on the front surface of the multifunction device 1 and has a rectangular shape elongated laterally to match the space above the protruding part 16. In other words, the control panel 4 has a height that falls within the distance obtained by subtracting the height of the printer 2 from the height of the scanner 3. The control panel 4 enables the user to control the printer 2 and scanner 3 and is provided with operating keys 40 and a liquid crystal display (LCD) 41. The user can input desired commands using the control panel 4. After the user inputs a desired command into the multifunction device 1, the control unit 20 controls the operations of the multifunction device 1 based on the inputted data.

The multifunction device 1 is configured to operate based not only on commands inputted via the control panel 4, but also commands transmitted from a PC or other computer connected to the multifunction device 1 via a printer driver, scanner driver, or the like.

As shown in FIG. 1, the LCD 41 has the largest possible height dimension that can be accommodated in the control panel 4 and a width dimension greater than four-thirds the height dimension. In other words, the ratio of width to height of the LCD 41 is set greater than 4/3. In this example, the ratio of width to height is 8/3.

A touch panel 100 having the same dimensions as the display screen of the LCD 41 is provided on the top surface of the LCD 41. The touch panel 100 is a common device configured of a pair of electrode plates having transparent electrodes arranged in a matrix configuration, for example. When the user presses on the touch panel 100 with a finger, pen, or the like, electrodes at the touched location contact each other and conduct electricity, enabling the touch panel 100 to detect the input position. The present invention is not particularly limited to the method of the touch panel 100 provided on the LCD 41. For example, in addition to a method of generating an input signal through a pressing operation, the touch panel may detect an input position and generate an input signal based on an infrared sensor, electric field sensor, or the like. Since a touch panel employing this method can detect the position of an object in proximity to the touch panel, even when the object is not touching the touch panel, this method can suppress contamination and damage to the display screen.

The multifunction device 1 is configured to display thumbnail images (hereinafter abbreviated as "thumbnails") of image data loaded in the multifunction device 1 on the LCD 41. In addition to the thumbnails, the multifunction device 1 also displays a scroll bar on the LCD 41 for selecting desired image data from the entire set of image data loaded in the device.

With this configuration, the user can execute an input operation through the touch panel 100 for the thumbnails or scroll bar displayed on the LCD 41. The multifunction device 1 recognizes the input position (details of the input operation) through input signals from the touch panel 100.

Figures 1, 10A:
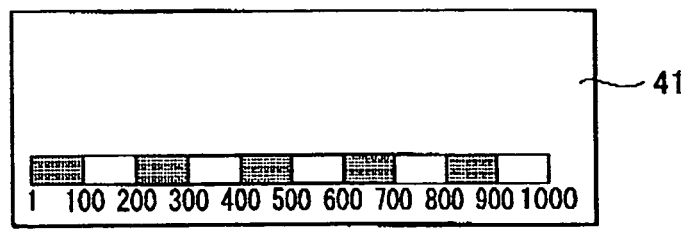
Figures 2, 10A:
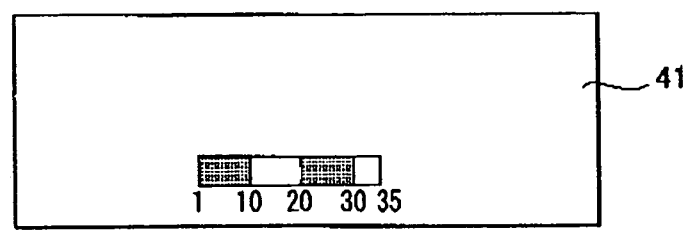

FIG. 2 is a block diagram showing the electrical structure of the multifunction device 1 having the above configuration. The multifunction device 1 includes a parallel interface 29 capable of connecting the multifunction device 1 to a PC via a cable, the USB terminal 71 capable of connecting the multifunction device 1 to a digital camera, and the slot section 72 for detachably inserting external media (storage media configured of flash memory, such as memory cards). With this configuration, image data can be inputted into the multifunction device 1 from a PC, digital camera, or external media.

The control unit 20 controls the overall operations of the multifunction device 1, including the printer 2, scanner 3, and control panel 4. As shown in FIG. 2, the control unit 20 is configured of a microcomputer primarily having a central processing unit (CPU) 21, a read-only memory (ROM) 22, a random access memory (RAM) 23, and an electrically erasable and programmable ROM (EEPROM) 24, all of which are connected to an application specific integrated circuit (ASIC) 26 via a bus 25.

The CPU 21 performs overall control of the multifunction device 1. The ROM 22 stores various control programs executed by the CPU 21, fixed values used by the CPU 21 when executing these programs, and the like. The ROM 22 includes a control program 22a for implementing a copier operation, printer operation, facsimile operation, and the like; and an image-processing program 22b for performing image processing.

The image-processing program 22b functions to select image data (original image data) inputted from the PC, digital camera, or external media via the parallel interface 29, USB terminal 71, or slot section 72 based on user input operations, and to correct the selected image data to generate output image data, for example. The program illustrated by flowcharts in FIGS. 4 through 8 is stored in the ROM 22 as part of the image-processing program 22b.

The image-processing program 22b also executes a process for displaying image data loaded in the multifunction device 1 as thumbnails on the LCD 41 that can be selected by the user and for displaying a scroll bar on the LCD 41 that facilitates the user in selecting desired image data. Identification data for all images is assigned to positions on the scroll bar. In the preferred embodiment, the identification data comprises image numbers assigned based on the inputted order of the images. When the user performs an input operation on the scroll bar through the touch panel 100, the multifunction device 1 displays on the LCD 41 images managed based on the identification data assigned to the input position (images having the identification data corresponding to the input position and to identification data near that position in the preferred embodiment). The identification data is assigned to individual segments of the scroll bar.

When there are a large number of images, multiple identification data is assigned to each narrow segment of the scroll bar. Accordingly, in a process for scrolling through the displayed images, the user must perform an enormous number of scrolling operations for moving a pointer P (slider) over the scroll bar before arriving at the desired image. However, since the image-processing program 22b immediately displays image data with identification data corresponding to a touched position on the scroll bar where the user touches the scroll bar, the user can display desired image data in a shorter amount of time than when sliding the pointer P over the scroll bar.

The image-processing program 22b also implements a process to modify the number of identification data assigned to each segment of the scroll bar (to distribute the identification data non-uniformly) when the scroll bar receives input. As a consequence, the number of images assigned around the input position can be reduced in the corresponding segments from the assigned number prior to input.

When identification data is selected through touch input, error (deviation from the intended input position) is likely to increase when the number of assigned identification data increases in a prescribed region of the scroll bar (a segment or unit length) because a slight deviation in the input position results in selecting identification data far from the desired data. Therefore, it becomes difficult to specify identification data for the desired image.

Here, the input position on the scroll bar is basically near identification data for a desired image. Hence, by reducing the number of identification data assigned near the input position per segment, the user can more easily visualize the position of identification data assigned to the image that the user wishes to display, facilitating image selection. As a result, this process can guide the user in selecting identification data for the desired image more accurately.

The RAM 23 is a rewritable memory that the CPU 21 uses as a storage area or a work area for temporarily storing various data used when executing the above programs. The RAM 23 includes an input image memory area 23a, an output image memory area 23b, an image number memory area 23c, a color setting memory area 23d, a segment number memory area 23e, an image counter 23f, and a segment counter 23g.

The input image memory area 23a functions to store image data inputted into the multifunction device 1 from a PC, digital camera, or external medium via the parallel interface 29, USB terminal 71, or slot section 72, respectively. Image data stored in the input image memory area 23a is updated when new image data is inputted into the multifunction device 1. Header data is attached to image data each time image data is inputted into the multifunction device 1. The header data includes an image number assigned to the image data as identification data based on the order of creation, size data indicating the size of the image, and a thumbnail image (thumbnail data) and is stored together with the image data in the input image memory area 23a. If a thumbnail image is not attached to the inputted image data, the multifunction device 1 creates a thumbnail image in a process for reducing the inputted image data.

The output image memory area 23b serves to store output image data to be outputted to the LCD 41, i.e., the image data developed into dot data. Images to be displayed on the LCD 41 including images of the scroll bar and the thumbnails are first written to the output image memory area 23b and subsequently outputted to the LCD 41.

The image number memory area 23c functions to store image numbers assigned to segments of the scroll bar in association with a count value of the segment counter 23g described later. The scroll bar is formed in a laterally elongated bar shape configured of segments having a predetermined size. Each segment of the scroll bar is specified by a count value of the segment counter 23g described later. In other words, the image number memory area 23c stores positions on the scroll bar in association with image numbers as identification data.

The multifunction device 1 sets the number (range) of input numbers assigned to each segment of the scroll bar when image data is inputted. As a rule, an equal number of image numbers is assigned to each segment. Further, image numbers are assigned to segments in increasing order toward the right of the scroll bar. The image numbers assigned to each segment are stored in the image number memory area 23c in association with the count number of the segment counter 23g indicating the segment to which the image numbers are assigned.

The color setting memory area 23d functions to store a number of colors used in the scroll bar displayed on the LCD 41. In the preferred embodiment, adjacent segments on the scroll bar are displayed in different colors in order to enhance visibility of the segments. The user performs input operations on a setting screen (display color setting screen) to set the number of colors used in the scroll bar.

The segment number memory area 23e functions to store the number of segments provided in the scroll bar to be displayed on the LCD 41. The user performs input operations on a setting screen (segment number setting screen) to set the number of segments provided in the scroll bar.

In the preferred embodiment, the user performs operations on the scroll bar by pressing on the touch panel 100 (touch input).

By providing the image processor described above with inputting means configured of a touch panel 100 superimposed over the display screen (LCD) 41, the user can perform input operations on the array through the touch panel 100. Since this configuration allows the user to visualize the locations of input, the user can more easily and intuitively grasp the method of performing input operations.

The multifunction device 1 is used by an unspecified number of people having fingers of different sizes. Hence, when the number of segments in the scroll bar is large, i.e., when the size of each segment is small, the segment may be smaller than the fingers of some users, creating difficulties for these users in performing input operations. To avoid such difficulties, the user can select the size of the segments based on the size of the user's finger.

The number of segments provided in the scroll bar and the number of colors used for segments is not limited to the example in the preferred embodiment, but may be arbitrarily set to a number greater or less.

The image counter 23f is used for saving the total number of inputted image data. Each time data for one image is written to the input image memory area 23a, the image counter 23f is incremented to keep track of the number of images stored in the input image memory area 23a. The count of the image counter 23f is set to an initial value of 0 and is reset to 0 after the image data stored in the input image memory area 23a has been processed.

The segment counter 23g functions to indicate the segment to which image numbers are assigned and changes within a range from 1 to a maximum value, where the maximum value is the number of segments provided in the scroll bar (the value stored in the segment number memory area 23e). A counter value of "1" in the segment counter 23g indicates the segment on the far left end of the scroll bar, and the specified segment moves rightward as the count value increases. The maximum count value of the segment counter 23g indicates the segment on the right end of the scroll bar.

A panel gate array 27 is also connected to the ASIC 26 for controlling the operating keys 40 through which the user inputs desired commands into the multifunction device 1. An LCD controller 28 is also connected to the ASIC 26 for controlling the screen displayed on the LCD 41. The LCD controller 28 displays data on the screen of the LCD 41 related to operations of the printer 2 and scanner 3 based on commands from the CPU 21. The LCD controller 28 also displays on the LCD 41 an image corresponding to data scanned by the scanner 3 or an image corresponding to data received from an external device connected to the multifunction device 1 or data extracted from a memory card inserted into the slot section 72 based on instructions from the CPU 21.

Also connected to the ASIC 26 are an amp 73 connected to a speaker 74, the touch panel 100 provided over the LCD 41, a network control unit (NCU) 31 connected to a public line 33 for implementing the facsimile function, and a modem 32 connected via the NCU 31. A network interface (not shown) may also be provided for exchanging data with computers on the network. The multifunction device 1 may also be provided with a telephone function for implementing a telephone call by connecting a handset to the NCU 31.

FIG. 3 conceptually illustrates the content of the image number memory area 23c. In this example, the scroll bar is formed with ten segments, and data for 1,000 images has been written to the input image memory area 23a.

Each segment of the scroll bar is given a segment name and associated with a count value of the segment counter 23g. In this example, segment A, segment B, . . . , and segment J extending from the leftmost end of the scroll bar toward the right are associated with count values 1, 2, . . . , and 10 of the segment counter 23g. The tables in FIG. 3 indicate the segment name in the center column, the value of the segment counter 23g in the column to the left of the segment name, and the image numbers stored in association with the count value of the segment counter 23g (i.e., the image numbers assigned to the segment) in the right column.

Figures 3A, 3B, 4:
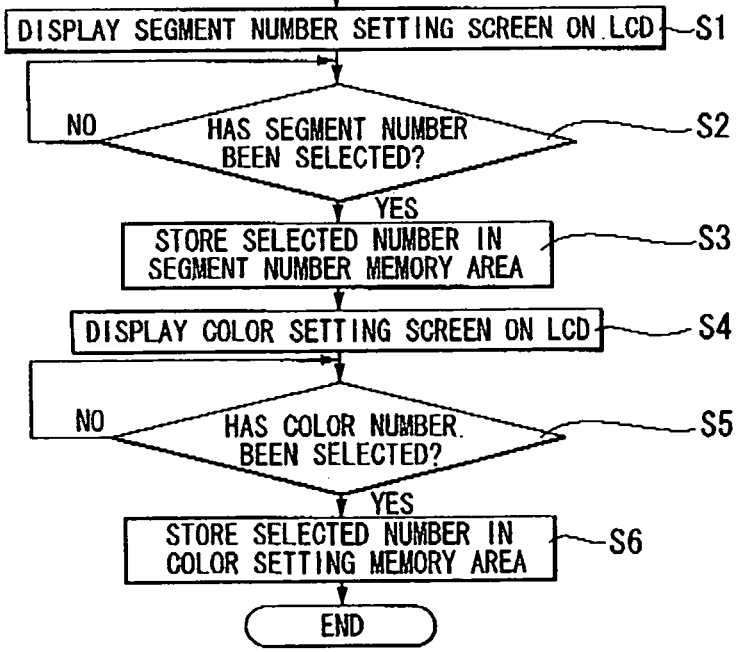
FIG. 3A and FIG. 3B are explanatory diagrams conceptually illustrating the content stored in an image number memory area.
FIG. 4 is a flowchart illustrating steps in a scroll bar setting process executed by a CPU of the multifunction device.

FIG. 3(a) shows the image numbers initially assigned to segments when image data is written from external media or the like to the input image memory area 23a. When image data is written to the input image memory area 23a, the total number of images is divided as evenly as possible into groups, and their corresponding image numbers (range of image numbers) are assigned to each segment. Since the number of inputted images in this example is 1000, 100 image numbers are assigned to each segment by evenly dividing the total number of images. Therefore, as shown in FIG. 3(a), the image number memory area 23c stores image numbers 1-100 in association with the count "1" of the segment counter 23g and image numbers 101-200 in association with the count "2" of the segment counter 23g. Similarly, subsequent ranges of 100 image numbers are stored in the image number memory area 23c with count values 3-10. If the number of images cannot be evenly divided, image numbers for the excess images (the remainder of the division) are assigned to the rightmost segment.

FIG. 3(b) shows the content of the image number memory area 23c after the user has performed an input operation on the scroll bar, changing the assignment of image numbers corresponding to each segment from the initial state shown in FIG. 3(a). FIG. 3(b) shows an example in which the input position on the scroll bar corresponds to image number 240.

When the user performs an input operation on the scroll bar, the multifunction device 1 is configured to reduce the number of image numbers assigned per segment for segments near the image number corresponding to the input position. In this example, the number of image numbers assigned per segment is reduced from the initial 100 image numbers per segment to 10 per segment within a range of ±20 from image number 240 at the input position, as shown in FIG. 3(b). Further, since the multifunction device 1 of the preferred embodiment is configured to move the image number at the input position to the center of the scroll bar, the multifunction device 1 moves the position assigned image number 240 to the center of the scroll bar (segment E) when an input operation is performed at the position of the 240. Therefore, image numbers assigned to segments D, E, F, and G are "221-230," "231-240," "241-250," and "251-260," respectively. The new ranges of image numbers are stored in the image number memory area 23c in association with corresponding count values 4-6 of the segment counter 23g.

Further, since the likelihood of the user selecting an image number decreases farther away from the image number at the input position, the number of image numbers assigned to each segment increases in steps when moving away from the input position. As shown in FIG. 3(b), 40 image numbers have been assigned to segments C and H. The remaining image numbers 1-180 on the left are divided in two and assigned to segments A and B, while the remaining image numbers 301-1,000 on the right are divided in two and assigned to segments I and J. After changing the assignments in this way, the modified ranges of image numbers are stored in the image number memory area 23c in association with the corresponding count values of the segment counter 23g, updating the previous content stored in the image number memory area 23c.

Next, an image process executed on the multifunction device 1 having the above construction will be described with reference to the flowcharts in FIGS. 4 through 8. FIGS. 9 and 10 show display screens on the LCD 41 displayed during execution of the image process and will be referred to as needed in the following description.

FIG. 4 is a flowchart illustrating steps in a scroll bar setting process executed by the CPU 21 of the multifunction device 1. FIG. 9 shows the display screen on the LCD 41 when the CPU 21 executes the scroll bar setting process and, thus, will be referenced in the following description.

The scroll bar setting process serves to set the state of the scroll bar displayed on the LCD 41 and begins when the user performs a prescribed operation on the operating keys 40. In S1 of the process the CPU 21 displays a segment number setting screen shown in FIG. 9(a) on the LCD 41. The display on the LCD 41 includes segment number selection buttons 41a in the right part thereof. The segment number selection buttons 41a includes a Small button 41a1, a Medium button 41a2, and a Large button 41a3. The segment number selection buttons 41a are displayed in the above order from top to bottom in the segment number setting screen. The Small button 41a1 sets the size of segments to the smallest size by setting the number of segments in the scroll bar to 10. The Medium button 41a2 sets the size of segments to a medium size by setting the number of segments in the scroll bar to 7. The Large button 41a3 sets the size of segments to the largest size by setting the number of segments in the scroll bar to 5. Scroll bar patterns 41b (41b1, 41b2, and 41b3) to be used when the user selects one of the buttons 41a1-41a3 are displayed to the left of the corresponding buttons 41a1-41a3.

In S2 the CPU 21 determines whether one of the segment number selection buttons 41a has been pressed in the segment number setting screen to set the number of segments. If none of the segment number selection buttons 41a was pressed (S2: NO), the CPU 21 continues to wait for input via the segment number selection buttons 41a. However, if one of the segment number selection buttons 41a was pressed (S2: YES), in S3 the CPU 21 writes the selected number of segments to the segment number memory area 23e and in S4 changes the display screen on the LCD 41 by outputting the color setting screen shown in FIG. 9(b) to the LCD 41.

Figure 9A:
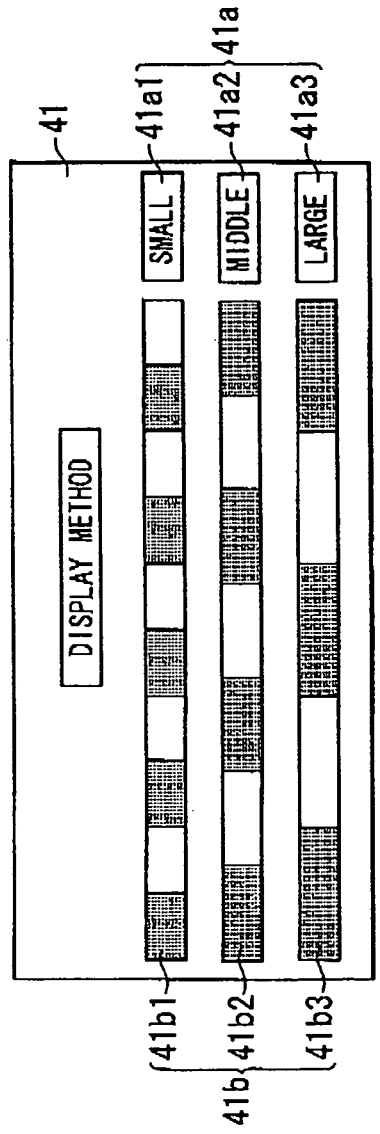
FIG. 9A and FIG. 9B are explanatory diagrams showing the display screen on an LCD during execution of the scroll bar setting process.
Figure 9B:
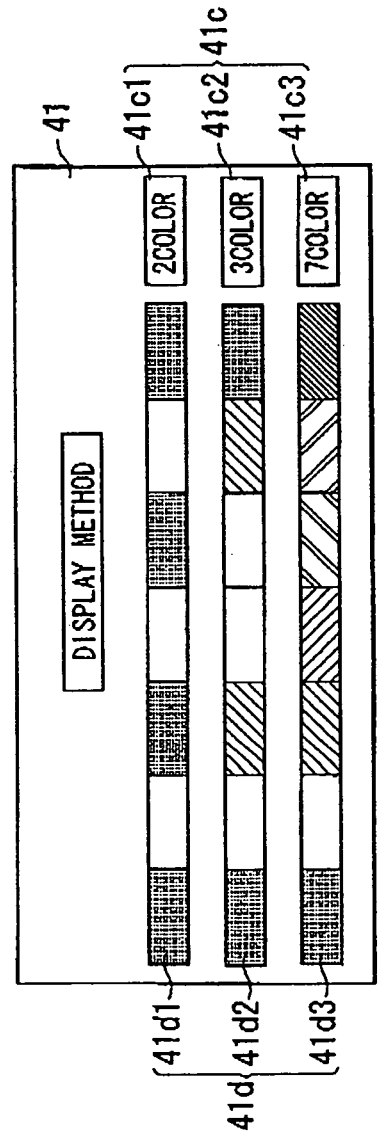

As shown in FIG. 9(b), display color selection buttons 41c are displayed in the right part of the color setting screen. The display color selection buttons 41c include a 2 Colors button 41c1, a 3 Colors button 41c2, and a 7 Colors button 41c3 and are displayed in the order given from top to bottom in the color setting screen. The 2 Colors button 41c1 specifies that two colors are to be used in the scroll bar. Similarly, the 3 Colors button 41c2 specifies that three colors while the 7 Colors button 41c3 specifies that seven colors are to be used in the scroll bar. Scroll bar patterns 41d (41d1, 41d2, and 41d3) to be used when the user selects one of the buttons 41c1-41c3 are displayed to the left of the corresponding buttons 41c1-41c3.

In S5 the CPU 21 determines whether the user pressed one of the display color selection buttons 41c in the color setting screen to select a number of colors. If none of the display color selection buttons 41c was pressed (S5: NO), the CPU 21 continues to wait for input through the display color selection buttons 41c. However, if one of the display color selection buttons 41c was pressed (S5: YES), in S6 the CPU 21 stores the selected number of colors (the number corresponding to the pressed display color selection button 41c) in the color setting memory area 23d and ends the scroll bar setting process.

If no input is received in the processes of S2 and S5 within a prescribed time, the CPU 21 executes a timeout process in steps not shown in FIG. 4 and subsequently ends the scroll bar setting process.

Figure 5:
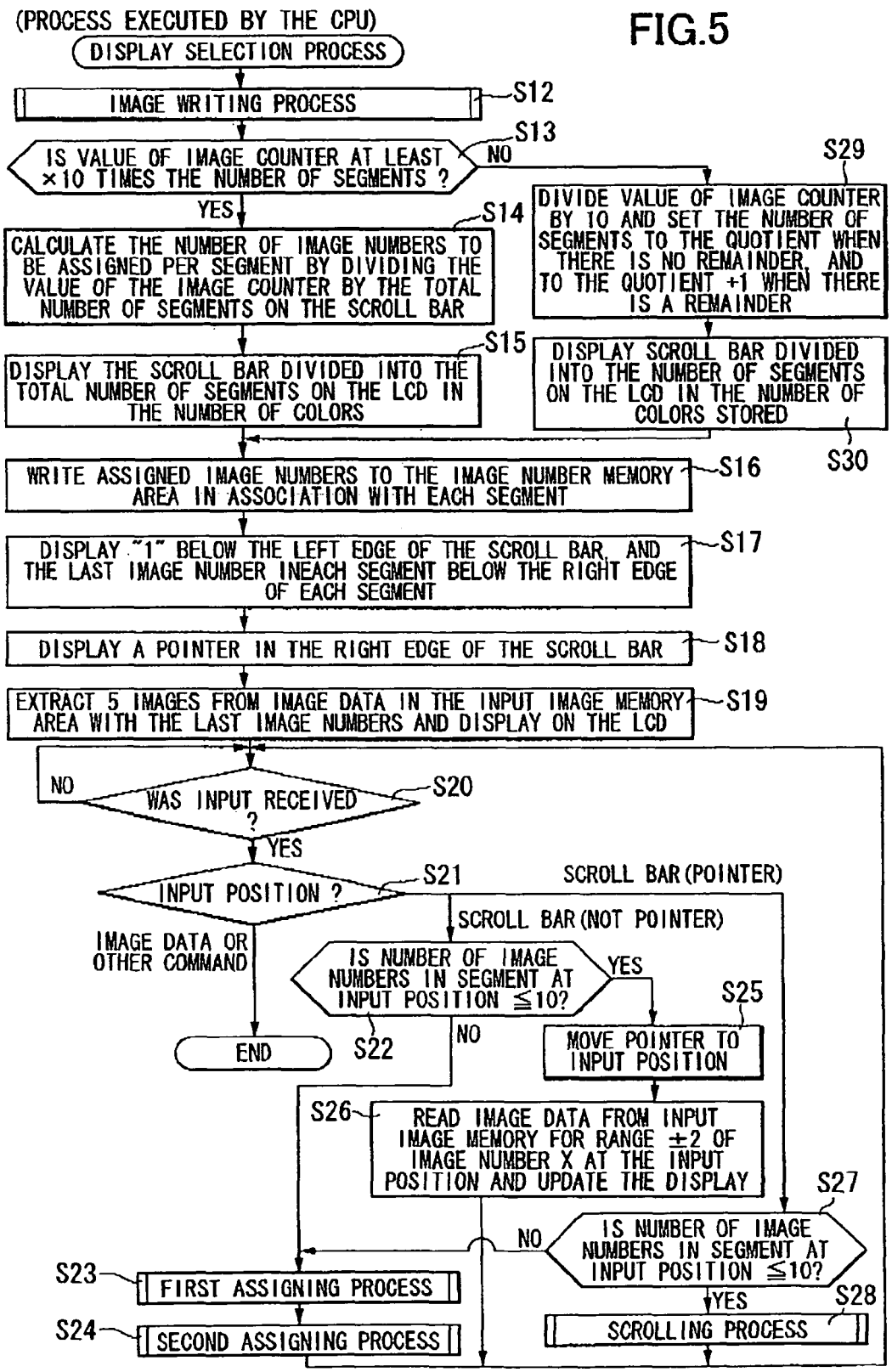
FIG. 5 is a flowchart illustrating steps in a display selection process executed by the CPU of the multifunction device.

FIG. 5 is a flowchart illustrating steps in a display selection process executed by the CPU 21 of the multifunction device 1. FIG. 10 shows screens displayed on the LCD 41 when the CPU 21 executes the display selection process for enabling the user to select inputted image data. Hence, FIG. 10 will be referenced while describing the display selection process of FIG. 5.

The display selection process enables the user to extract and display desired image data from image data inputted into the multifunction device 1. The process begins when image data is inputted into the multifunction device 1 from external media or the like. In S12 at the beginning of the display selection process, the CPU 21 executes an image writing process to write image data to the input image memory area 23a. While image data is written from external media or the like to the input image memory area 23a in the image writing process of S12, the CPU 21 also increments the count held by the image counter 23f each time data for one image is written. Accordingly, the image counter 23f indicates the total number of inputted images.

In S13 the CPU 21 determines whether the count stored in the image counter 23f exceeds a value ten times the number of segments (total number of divisions in the scroll bar) stored in the input image memory area 23a. If the count exceeds ten times the number of segments stored in the segment number memory area 23e (S13: YES), then the CPU 21 can assign ten or more image numbers to each segment in the scroll bar. Therefore, in S14 the CPU 21 calculates the number of image numbers to be assigned to each segment by dividing the count in the image counter 23f by the number of segments stored in the segment number memory area 23e (i.e., to achieve an equal distribution per segment). In S15 the CPU 21 displays a scroll bar divided into the number of segments stored in the segment number memory area 23e on the LCD 41 using the number of colors stored in the color setting memory area 23d. The display colors and the order of these colors is preset based on the selected number of colors, and in S15 the CPU 21 displays each segment of the scroll bar based on the preset order of the display colors.

In S16 the CPU 21 stores a range of image numbers in the image number memory area 23c with the amount calculated in S14 to be assigned to each segment (each count number of the segment counter 23g indicating a segment), where the ranges of image numbers are sequential and begin from the first image number (see FIG. 3). When dividing the image numbers equally in S14, image numbers for images corresponding to any remainder from this division are assigned to the rightmost segment J. In S17 the CPU 21 displays a "1" below the left edge of the scroll bar to indicate the first image number, and the number corresponding to the last image number of each segment below the right edge of the same segment.

The display screen shown in FIG. 10(a-1) is the result of performing the process in S14-S17 to display a scroll bar with ten segments in the lower portion of the screen. The segments of the scroll bar are arranged in the order segment A, segment B, . . . , and segment J beginning from the left and are displayed alternately in two colors. In the example shown in FIG. 10(a-1), 1,000 images have been inputted from external media and image numbers for the inputted image data have been assigned in units of 100 for each segment. A "1" is displayed below the left edge of segment A as an image number indicating that the left edge of segment A is the starting side, while the last image number assigned to each segment (100, 200, . . . , and 1,000) is displayed below the right edge of each segment. In this way, the user can easily recognize the image numbers assigned to each segment.

The image processor having the above construction displays image numbers for each image in the group of images stored in the input image memory area 23a based on the order of image numbers, with at least image numbers at the beginning or end displayed at a position corresponding to one or the other end of the array displayed on the display screen, enabling the user to understand the image numbers associated with the array. Therefore, the user can perform an accurate input operation (operation to select image numbers) on the array in order to extract a desired image while using the displayed image numbers as a guideline.

Further, scroll bar divided into the number of segments on the LCD 41 outputs an array to the display screen having a single pattern extending linearly from one end to the other, reducing operational error by the user. For example, if a plurality of arrays were displayed on the display screen, the user would be more susceptible to performing an input operation on an array other than the desired array. However, since a single linear array is displayed in the image processor of the present invention, the user need only perform input operations on one array. As a result, user input operations are simplified, making it less likely that the user will perform an incorrect operation by inadvertently touching the wrong array or mistakenly performing an input operation on the wrong array.

In S18 the CPU 21 displays a pointer P in the right edge of the scroll bar and in S19 extracts five images from the image data written to the input image memory area 23a corresponding to the last five image numbers and displays these images on the LCD 41. The images displayed on the LCD 41 in the display selection process are thumbnails for the inputted image data.

Figure 10B:
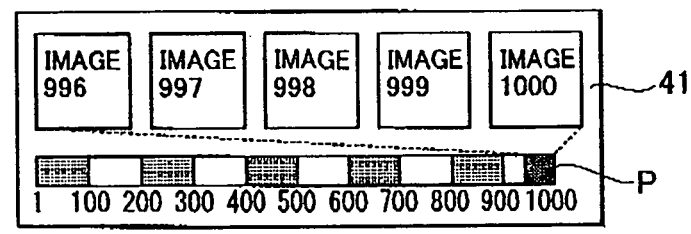

FIG. 10(b) shows the screen displayed on the LCD 41 after performing steps S18 and S19 and includes the pointer P on the right edge of the scroll bar shown in FIG. 10(a-1) indicated by a gray rectangle in FIG. 10, as well as the five images corresponding to the last five image numbers (images having image numbers 996-1000) from image data stored in the input image memory area 23a displayed above the scroll bar.

In S20 the CPU 21 determines whether input was received. The CPU 21 continues to wait for input while input has not been received (S20: NO). When input has been received (S20: YES), in S21 the CPU 21 determines the input position. If the input position corresponds to an image displayed on the LCD 41 or if the input is another type of input excluding input on the scroll bar (such as a cancel command performed through a prescribed operation on the operating keys 40; S21: image or other operation), the CPU 21 ends the display selection process. In other words, when the user touches an image on the display screen, the CPU 21 determines that image data has been selected. Since the function of the display selection process is to provide the user with means for selecting image data to be processed, once the user touches an image, the CPU 21 determines that a selection has been completed and ends the display selection process.

If the CPU 21 determines in S21 that the input position corresponds to a position in the scroll bar displayed on the LCD 41 and a position other than the pointer P (S21: scroll bar (not pointer P)), in S22 the CPU 21 determines whether the number of image numbers assigned to the segment at the input position is ten or less. If the number exceeds ten (S22: NO), the CPU 21 performs a first assigning process in S23 and a second assigning process in S24 to reassign image numbers in order to redisplay the scroll bar with fewer image numbers assigned per segment near the image number corresponding to the input position. Subsequently, the CPU 21 returns to S20 and determines whether new input has been received.

In S21 the CPU 21 determines the input position on the LCD 41 based on an input number received from the touch panel 100. For example, if the user touches a position within segment C indicated by the arrow in FIG. 10(c), the CPU 21 recognizes the coordinates at the input position and determines that the input position is within segment C. Since the input position is on the scroll bar and outside the pointer P, the CPU 21 determines which image number in the segment has been specified based on the coordinates of the input position relative to the length of the segment.

Figure 10C:
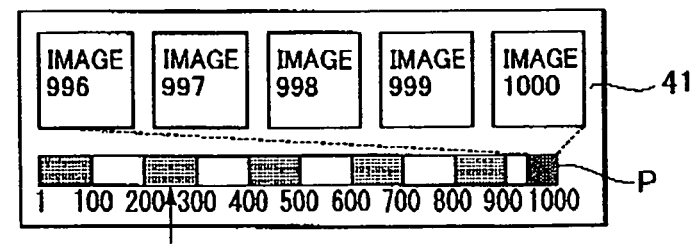

The multifunction device 1 manages image numbers corresponding to each position on the scroll bar by storing the image numbers in the image number memory area 23c in the display selection process in association with each segment of the scroll bar (value of the segment counter 23g specifying each segment) and determines the assigned position of each image number within the corresponding segment based on the ratio of the input position to the length of the segment. In the example of FIG. 10(c), the CPU 21 determines that an input number X at the input position indicated by the arrow is 240.

If the CPU 21 determines in S22 that ten or fewer image numbers are assigned to the segment at the input position (S22: YES), in S25 the CPU 21 shifts the display of the pointer P to the input position and in S26 reads image data from the input image memory area 23a corresponding to five images in the range ±2 of image number X at the input position and outputs this image data to the LCD 41 to update the display on the LCD 41. Subsequently, the CPU 21 returns to S20 to determine whether new input was received.

On the other hand, if the CPU 21 determines in S21 that the input position corresponds to the pointer P on the scroll bar displayed on the LCD 41 (S21: scroll bar (pointer P)), in S27 the CPU 21 determines whether the number of image numbers assigned to the segment at the input position is ten or less. If the number exceeds ten (S27: NO), then the CPU 21 performs the allocating processes in S23 and S24 described above to redisplay the scroll bar with fewer image numbers assigned per segment near the image number corresponding to the input position.

However, if the CPU 21 determines in S27 that ten or fewer image numbers are assigned to the segment at the input position (S27: YES), indicating that the number of image numbers assigned per segment is sufficiently small not to require reassigning, in S28 the CPU 21 executes a scrolling process to scroll the displayed images based on the pressing operation. Subsequently, the CPU 21 returns to S20 and determines whether new input has been received.

Further, if the CPU 21 determines in S13 that the count value of the image counter 23f is less than ten times the number of segments stored in the segment number memory area 23e (total number of segments in the scroll bar; S13: NO), in S29 the CPU 21 divides the count in the image counter 23f by 10 and sets the number of segments in the scroll bar to the quotient, if there is no remainder, or to the quotient +1, if there is a remainder.

In S30 the CPU 21 displays the scroll bar with the number of segments stored in the segment number memory area 23e on the LCD 41 using the number of colors stored in the color setting memory area 23d, and subsequently advances to S16 described earlier. When performing the process in S16 after the process in S29, the CPU 21 writes ranges of ten image numbers each beginning from the first image number in association with each segment in order beginning from segment A to the image number memory area 23c.

FIG. 10(a-2) shows a sample screen displayed when the processes in S29 and S30 are performed instead of the processes in S14 and S15. In the example of FIG. 10(a-2), only 35 images have been inputted. Therefore, in S29 and S30 the number of segments is set to four, segments A-D, and in S16 ten image numbers are assigned to each of the segments A-C, with the remaining five image numbers assigned to segment D. The remaining pattern of the scroll bar is identical to that in FIG. 10(a-1), wherein each segment is alternately displayed in one of two colors, image number 1 is displayed below the left edge of the scroll bar, and the last image number assigned to each segment (10, 20, 30, and 35) is displayed below the right edge of each segment.

In the preferred embodiment, image numbers are assigned to the scroll bar in order that the user can extract image data to be displayed on the LCD 41 from the total image content. When the user specifies a point on the scroll bar through a single operation of touching the touch panel at the desired position, the CPU 21 reads image data from the input image memory area 23a specified by the image number corresponding (assigned) to this point (input position) and displays the image data on the LCD 41.

With this configuration, it is difficult to specify a single image number belonging to a segment when a large amount of image data has been loaded into the multifunction device 1 because the number of image numbers assigned to each narrow segment can be considerably large. Accordingly, when the user touches the scroll bar near an image number corresponding to desired image data, the multifunction device 1 of the preferred embodiment reduces the number of image numbers assigned per segment near this image number through the first and second assigning processes of S23 and S24 described later, thereby enabling the user to more easily select the desired image number within the segment.

Figure 6:
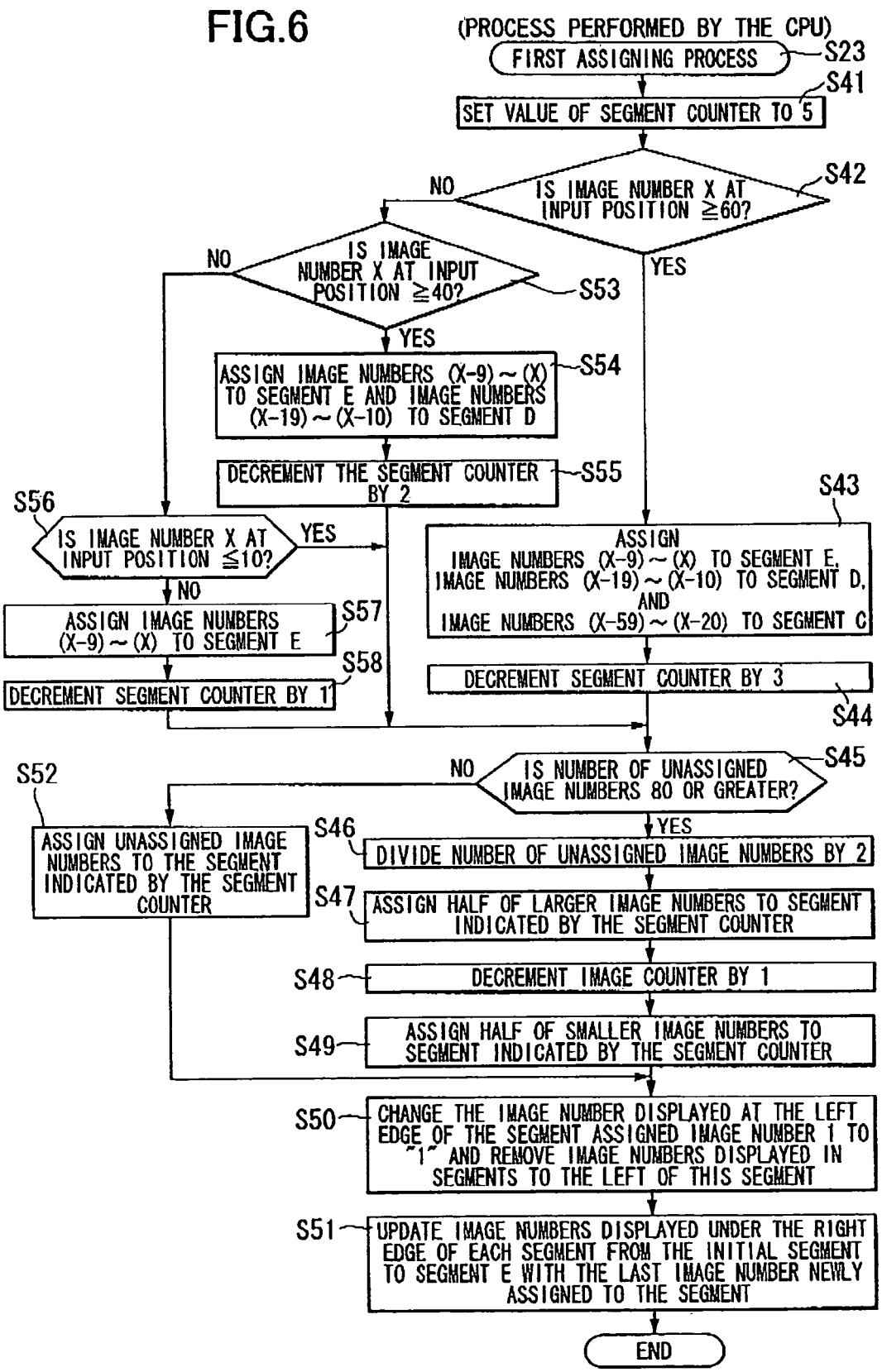
FIG. 6 is a flowchart illustrating steps in a first assigning process executed during the display selection process in FIG. 5.

FIG. 6 is a flowchart illustrating steps in the first assigning process in S23 executed during the display selection process of FIG. 5. The first assigning process serves to reassign image numbers on the left side of the image number corresponding to the input position on the scroll bar. This process reduces the number of image numbers assigned per segment for segments near the image number at the input position.

In S41 of the first assigning process, the CPU 21 sets the count value of the segment counter 23g to 5. In S42 the CPU 21 sets X to the image number at the input position where the user touched the scroll bar and determines whether X is 60 or greater. If X is at least 60 (S42: YES), then in S43 the CPU 21 allocates image numbers from (X−9) through X to segment E, image numbers (X−19) through (X−10) to segment D, and image numbers (X−59) through (X−20) to segment C. In S44 the CPU 21 decrements the count of the segment counter 23g by 3.

In S45 the CPU 21 determines whether the number of image numbers less than X not yet assigned is at least 80. If the number is at least 80 (S45: YES), then in S46 the CPU 21 divides the number of image numbers less than X not yet assigned by two and in S47 assigns the divided half with the larger image numbers to the segment indicated by the count value of the segment counter 23g. In S48 the CPU 21 decrements the count of the segment counter 23g by 1 and in S49 assigns the half with the smaller image numbers to the segment indicated by the count value of the segment counter 23g.

Figure 10D:
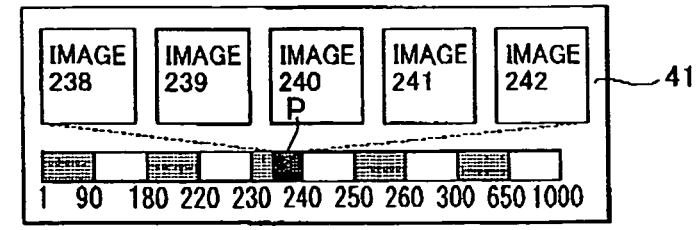

The example of FIG. 10(d) shows the scroll bar displayed after reallocating image numbers based on image number 240 as the input position. Since X is 240, image numbers 231-240 are assigned to segment E, image numbers 221-230 are assigned to segment D, and image numbers 181-220 are assigned to segment C after executing the process in S41-S49 to reassign image numbers, as shown in FIG. 10(d). Since the count of the segment counter 23g is "2" and the number of remaining image numbers to be assigned is 180, the 90 larger image numbers 91-180 are assigned to segment B. Subsequently, since the count of the segment counter 23g is decremented to "1", the remaining image numbers 1-90 are assigned to segment A.

After completing the process in S49, in S50 the CPU 21 changes the image number at the left edge of the segment assigned image number 1 (beginning segment) to "1" and erases image numbers displayed below segments to the left of the beginning segment. In S51 the CPU 21 displays the last image number among image numbers newly assigned to each segment (largest image number of each segment) below the right edge of each segment from the initial segment to segment E, and subsequently ends the first assigning process.

Further, if the CPU 21 determines in S45 that the number of unassigned image numbers is less than 80 (S45: NO), then in S52 the CPU 21 assigns the unassigned image numbers to the segment indicated by the count of the segment counter 23g and subsequently advances to S50.

Further, if the CPU 21 determines in S42 that the image number X at the input position is less than 60 (S42: NO), then assignments according to the process in S43 cannot be performed. Accordingly, in S53 the CPU 21 determines whether the image number X at the input position is at least 40. If X is at least 40 (S53: YES), then in S54 the CPU 21 assigns image numbers (X−9) through X to segment E and image numbers (X−19) through (X−10) to segment D. In S55 the CPU 21 decrements the count of the segment counter 23g by 2 and advances to S45. Hence, after performing the assignment in S54, the CPU 21 assigns the remaining image numbers to segment C in the process beginning from S45.

However, if the image number X is less than 40 (S53: NO), then in S56 the CPU 21 determines whether the image number X at the input position is less than or equal to 10. If X is less than or equal to 10 (S56: YES), then the CPU 21 advances to S45 and assigns all of the 10 or less image numbers to segment E through the process beginning from S45 since the count value of the segment counter 23g is still "5".

However, if the image number X at the input position exceeds 10 (S56: NO), then in S57 the CPU 21 assigns ten image numbers from (X−9) through X to segment E. In S58 the CPU 21 decrements the count in the segment counter 23g by 1 in order to assign the remaining image numbers and advances to S45. Hence, after performing the assignment in S57, the CPU 21 assigns the remaining image numbers to segment C through the process beginning from S45.

In this way, if input is received on the scroll bar, the first assigning process can be performed to reassign image numbers on the left side of the image number corresponding to the input position. The first assigning process can reassign image numbers so that the number assigned to the segment including the image number at the input position on the scroll bar is no greater than 10.

Figure 7:
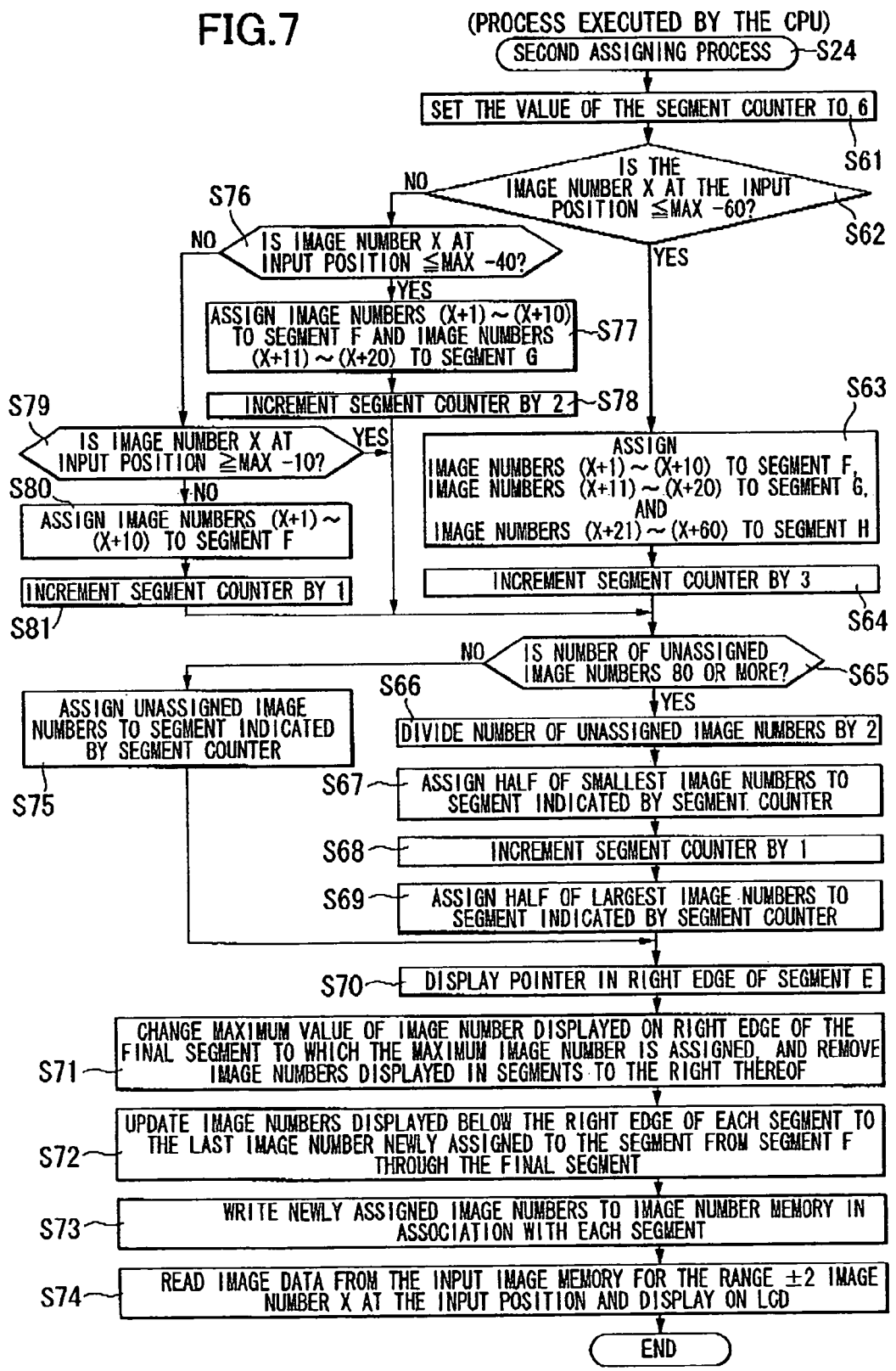
FIG. 7 is a flowchart illustrating steps in a second assigning process executed during the display selection process in FIG. 5.

FIG. 7 is a flowchart illustrating steps in the second assigning process of S24 executed during the display selection process of FIG. 5. The second assigning process serves to reassign image numbers following the image number corresponding to the input position on the scroll bar and to reduce the number of image numbers allocated per segment in segments near the image number at the input position.

In S61 of the second assigning process, the CPU 21 sets the count of the segment counter 23g to "6". In S62 the CPU 21 determines whether the image number X at the input position on the scroll bar is no greater than (the maximum image number—60). If X is no greater than (the maximum image number—60) (S62: YES), then in S63 the CPU 21 assigns image numbers (X+1) through (X+10) to segment F, image numbers (X+11) through (X+20) to segment G, and image numbers (X+21) through (X+60) to segment H. In S64 the CPU 21 increments the count of the segment counter 23g by 3.

In S65 the CPU 21 determines whether the number of image numbers greater than X that have not yet been assigned is 80 or greater. If this number is 80 or greater (S65: YES), then in S66 the CPU 21 divides the number of unassigned image numbers greater than X by two and in S67 assigns the half with smaller image numbers to the segment indicated by the count of the segment counter 23g. In S68 the CPU 21 increments the count of the segment counter 23g by 1 and in S69 assigns the second half with larger image numbers to the segment indicated by the count of the segment counter 23g.

Since the image number X is 240 and the maximum image number is 1,000 in the example shown in FIG. 10(d), when performing the process in S61-S69 the CPU 21 assigns image numbers 241-250 to segment F, image numbers 251-260 to segment G, and image numbers 261-300 to segment H. At this time, the count of the segment counter 23g is "9" and the number of remaining image numbers is 700. Accordingly, the CPU 21 assigns the smaller 350 image numbers 301-650 to segment I, and subsequently assigns the remaining image numbers 651-1000 to segment J after incrementing the count of the segment counter 23g to "10".

After completing the process in S69, in S70 the CPU 21 displays the pointer P in the rear end of segment E. In S71 the CPU 21 changes the image number displayed beneath the right edge of the segment to which the maximum image number has been assigned (the rightmost segment) to the maximum value and deletes image numbers displayed for segments to the right of the final segment. In S72 the CPU 21 updates the previously displayed image numbers by displaying the last (largest) image number among image numbers newly assigned to each segment for segment F through the final but one segment beneath the right edge of each segment. In S73 the CPU 21 writes the image numbers newly assigned in the present process and the first assigning process executed above to the image number memory area 23c in association with count values of the segment counter 23g specifying the corresponding segment, and in S74 updates the previous display of image data by reading image data from the input image memory area 23a corresponding to images in the range ±2 of image number X at the input position and outputs this image data to the LCD 41. Subsequently, the CPU 21 ends the second assigning process of S24.

On the other hand, if the CPU 21 determines in S65 that the number of unassigned image numbers is less than 80 (S65: NO), then in S75 the CPU 21 assigns the unassigned image numbers to the segment indicated by the count of the segment counter 23g, and subsequently advances to S70.

Further, if the CPU 21 determines in S62 that the image number X at the input position exceeds (the maximum image number—60) (S62: NO), then it is not possible to perform allocation according to the process in S63. Therefore, in S76 the CPU 21 determines whether the image number X at the input position is no greater than (the maximum image number—40). If X is no greater than (the maximum image number—40) (S76: YES), then in S77 the CPU 21 assigns image numbers from (X+1) through (X+10) to segment F and assigns image numbers from (X+11) through (X+20) to segment G. In S78 the CPU 21 increments the count of the segment counter 23g by 2 and subsequently advances to S65. Hence, after performing the assignment in S77, the CPU 21 assigns the remaining image numbers to segment H in the process beginning from S65.

However, if the CPU 21 determines in S76 that X exceeds (the maximum image number—40) (S76: NO), then in S79 the CPU 21 determines whether the image number X at the input position exceeds (the maximum image number—10). If X exceeds (the maximum image number—10) (S79: YES), then the CPU 21 advances to S65. Since the number of unassigned image numbers is ten or less and the count of the segment counter 23g remains at "6", the CPU 21 assigns all of the remaining ten or less image numbers to segment F in the process beginning from S65.

However, if the CPU 21 determines in S79 that X is less than (the maximum image number—10) (S79: NO), then in S80 the CPU 21 assigns the ten image numbers (X+1) through (X+10) to segment F. In S81 the CPU 21 increments the count of the segment counter 23g by 1 to assign the remaining image numbers, and subsequently advances to S65. Hence, after performing the assignment in S80 the CPU 21 assigns the remaining image numbers to segment G in the process beginning from S65.

Through the second assigning process, the CPU 21 can reassign image numbers following the image number that corresponds to the input position on the scroll bar. This process also ensures that the number of image numbers assigned to the segment including the image number at the input position will be no greater than 10 after reassignment.

Figure 8:
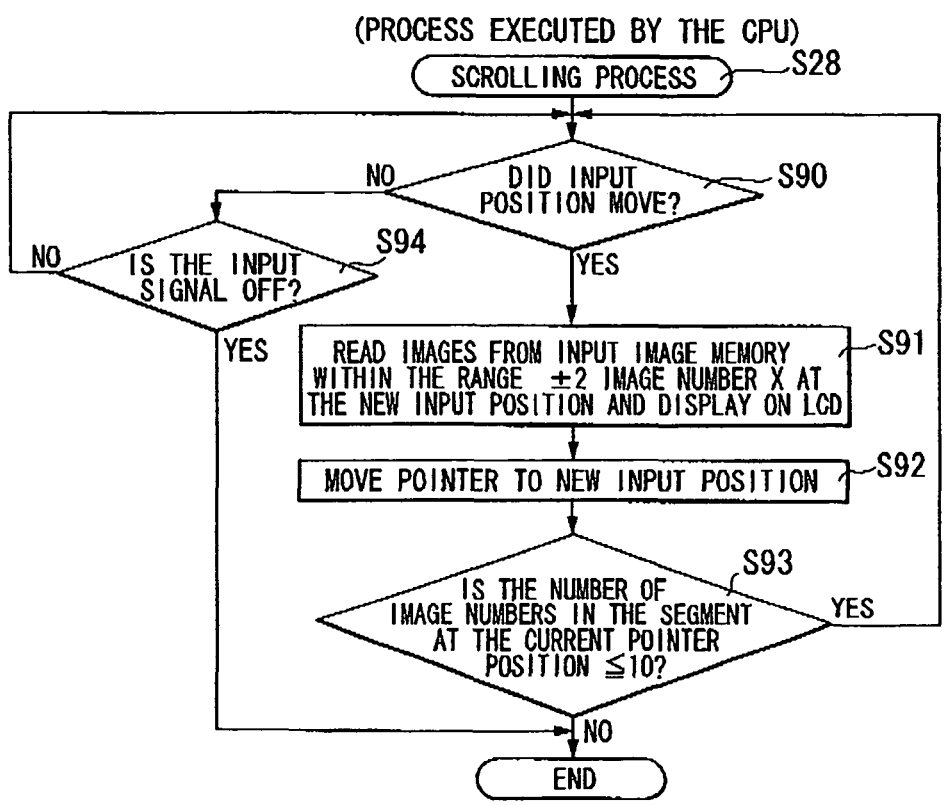
FIG. 8 is a flowchart illustrating steps in a scrolling process executed during the display selection process in FIG. 5.

FIG. 8 is a flowchart illustrating steps in the scrolling process of S28 executed during the display selection process of FIG. 5. The scrolling process of S28 serves to scroll image data in the display when the user touches and slides the pointer P on the scroll bar while the number of image numbers assigned to the segment at the input position is ten or less. In S90 at the beginning of the scrolling process, the CPU 21 determines whether the input position has moved from the initial display position at the pointer P (previous input position). If the input position has moved (S90: YES), indicating that the user has performed a sliding operation from the pointer P, in S91 the CPU 21 updates the display of image data by reading image data from the input image memory area 23a corresponding to image numbers in the range ±2 of image number X at the new input position and outputs this image data to the LCD 41.

In S92 the CPU 21 changes the display of the pointer P to the new input position. In S93 the CPU 21 determines whether the number of image numbers assigned to the segment at the current position of the pointer P is no greater than ten. If the number of image numbers is no greater than ten (S93: YES), the CPU 21 returns to S90 and continues to execute the scrolling operation. However, if the number of image numbers exceeds ten (S93: NO), then the CPU 21 ends the scrolling process of S28. Accordingly, the CPU 21 advances to S20 in the display selection process of FIG. 5 when the user performs a sliding operation to move the pointer P to a segment to which more than ten image numbers is assigned. Therefore, the CPU 21 advances to S23 via S21 and S27 and performs the reassigning processes in S23 and S24 to set the number of image numbers assigned to the segment at the new pointer position to ten or less.

However, if the CPU 21 determines in S90 that the input position has not moved from the initial display position of the pointer P (initial input position; S90: NO), in S94 the CPU 21 determines whether the input signal on the touch panel 100 has turned off (i.e., whether the user is no longer touching the touch panel 100). If the input signal remains on (S94: NO), then the CPU 21 returns to S90 and waits until the input position has moved or the input signal has turned off. When the CPU 21 determines in S94 that the input signal has turned off (S94: YES), indicating that the user has lifted the user's finger from the touch panel 100 without sliding the pointer P, the CPU 21 ends the scrolling process of S28.

In this way, the multifunction device 1 of the preferred embodiment assigns image numbers to each segment on the scroll bar (internally) and displays image data corresponding to the image number assigned to a position on the scroll bar touched by the user, thereby eliminating the need to perform scrolling operations. This configuration enables the user to more easily and quickly select desired image data from among a large amount of data than a configuration in which the user searches for (selects) desired image data by scrolling the image data.

When input is received in step S20, the input position is determined in step S21. Since image number is managed in step S17 in association with each position in the array, the images including an image identified by image numbers corresponding to the input position (images selected in S21) can be displayed on the LCD 41 when the input position is determined to correspond to the array on the LCD 41. In other words, since image numbers is managed in association with positions on the displayed array, when the user selects a desired image from the group of images through an input operation on the array, the desired image can be displayed on the LCD 41, thereby directly extracting the desired image from the group of images.

Accordingly, the user need not perform scrolling operations according to a common scroll bar device to repeatedly scroll the images sequentially until the desired image is displayed. When sequentially scrolling images through such scrolling operations, the images must be continuously read from the input image memory area 23a and displayed on the LCD 41, requiring a large amount of processing time since images contain a large amount of data. However, the device in the present embodiment enables the user to find the desired image without performing scrolling operations, thereby greatly reducing the time required for the user to find (extract) the desired image and reducing the amount of stress on the user when the user is waiting for images to be displayed.

Further, when input is received on the array, the first assigning process and the second assigning process increases the number of assigned image numbers for segments other than the segment whose number of assigned identification data was reduced from the number prior to input being received. Accordingly, image numbers for all images in the group initially assigned to the array can remain assigned to the array. Hence, if the user again attempts to select a different image from the group, the user can perform the selection operation (input on the array) within the same screen. Accordingly, the image processor improves user-friendliness by enabling the user to extract new images quickly.

Further, when a large amount of image data has been inputted into the multifunction device 1 and the user attempts to select image data by touching the scroll bar, it is quite possible that image data will be selected at a position offset from the intended image number because image numbers are densely assigned to each segment. However, distributing image numbers non-uniformly according to the method of the preferred embodiment described above can reduce the number of image numbers assigned to the segment including the image number at the input position, thereby enabling the user to more easily identify an image number through an input operation. In other words, the user can more exactly select a desired image number, i.e., image data that the user wishes to display, through an input operation on the scroll bar.

Further, scroll bar divided into the number of segments on the LCD displays an array of a size that can fit within the display screen, and the first assigning process and the second assigning process assigns image numbers identifying each image in the group of images to specification data specifying segments of the array based on the order of the image numbers. Accordingly, the user can specify image numbers for all images of the group through the array displayed in one screen, i.e., there are no images that cannot be specified. As a result, the user can efficiently extract (display on the display screen) a desired image from among the group of images by performing an operation in one screen, without having to switch the display screen.

Further, while image numbers is densely assigned within each segment when the group of images includes a large number of images, the number of assigned image numbers within a segment including image numbers associated with a position determined in step S21 can be reduced from the number prior to receiving input, thereby expanding the range in the array occupied by a single image numbers. Therefore, after the user performs at least one input operation in the array, the image processor according to the present embodiment prevents an input position of a subsequent user operation from greatly missing the assigned position of the desired image numbers, enabling the user to accurately select the desired image numbers.

In addition, by increasing the number of image numbers assigned per segment for ranges of image numbers less likely to be selected by the user (image numbers far from the image number at the input position), all image numbers initially assigned to the scroll bar can remain assigned to the scroll bar. This configuration enables the user to select different image data by performing a selection operation in the same screen, thus improving the user-friendliness of the multifunction device 1 by enabling the user to select new image data more quickly.

Since image numbers are reassigned so that the image number at the input position is centered in the scroll bar, the user can easily visualize the desired image number, facilitating subsequent operations by the user.

Further, by forming the scroll bar in a simple rectangular shape having segments corresponding to image numbers, where the image numbers function as identification data, the scroll bar can be quickly displayed.

Next, a second embodiment of the present invention will be described with reference to FIGS. 11 through 13. The multifunction device 1 according to the first embodiment described above uses image numbers pre-assigned to image data (or image numbers assigned in the order that images are loaded into the multifunction device 1) as identification data and enables the user to select desired image data using a scroll bar to which the image numbers are assigned. In contrast, the multifunction device 1 according to the second embodiment uses date data as the identification data and manages the image data hierarchically based on this date data.

The date data includes values for the year, month, and day and indicates the date on which the image data was created. Date data is assigned to each segment of the scroll bar in the second embodiment. When the user performs an input operation on the scroll bar, the multifunction device 1 is configured to output image data corresponding to the date data assigned to the input position to the LCD 41. In the following description, like parts and components have been designated with the same reference numerals as those used in the first embodiment to avoid duplicating description.

Figure 11:
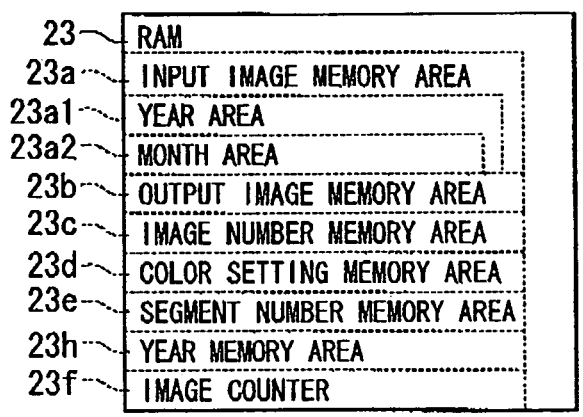
FIG. 11 is an explanatory diagram showing the structure of RAM provided in a multifunction device according to a second embodiment.

FIG. 11 shows the structure of the RAM 23 provided in the multifunction device 1 according to the second embodiment. The input image memory area 23a of the RAM 23 in the second embodiment includes a year area 23a1 for managing (storing) inputted image data in a hierarchical arrangement based on the date data added to the image data.

The year area 23a1 is an area associated with year data included in the date data provided with the image data. One year area 23a1 is provided for each year of the inputted image data. The inputted image data is written to the corresponding year area based on the year data in the date data. Month areas 23a2 are provided in each year area 23a1 for storing image data based on the month in which the image data was created.

The year area 23a1 includes twelve areas corresponding to the twelve months from January to December, each area storing image data of the corresponding month. Inputted image data is written to the corresponding month area 23a2 in the year area 23a1 based on month data in the date data.

The RAM 23 in the second embodiment is also provided with a year memory area 23h. The year memory area 23h functions to store a year specified by the user, i.e., a year corresponding to an input position on the scroll bar. When the multifunction device 1 according to the second embodiment displays image data, the CPU 21 references the year data stored in the year memory area 23h, and reads image data from the year area 23a1 corresponding to this year data on the LCD 41 (see FIG. 12).

In the second embodiment, the image counter 23f is configured to count the number of images for which data is written to each year area 23a1. The count of the image counter 23f is stored in a prescribed area of the RAM 23 in association with each year. Accordingly, in the second embodiment, several of the image counters 23f may be provided to correspond to the number of years in the image data or a single image counter 23f may be configured to count image data for each year. In the latter case, the image counter 23f is reset to 0 before starting to count image data for the next year. The segment counter 23g in the first embodiment described above is not included in the second embodiment.

In the second embodiment, a bar is displayed on the LCD 41 with identification data for the images. While the user cannot perform a scrolling operation by sliding the pointer P, as described in the first embodiment, for convenience the bar will also be referred to as a scroll bar in the second embodiment.

Figure 12:
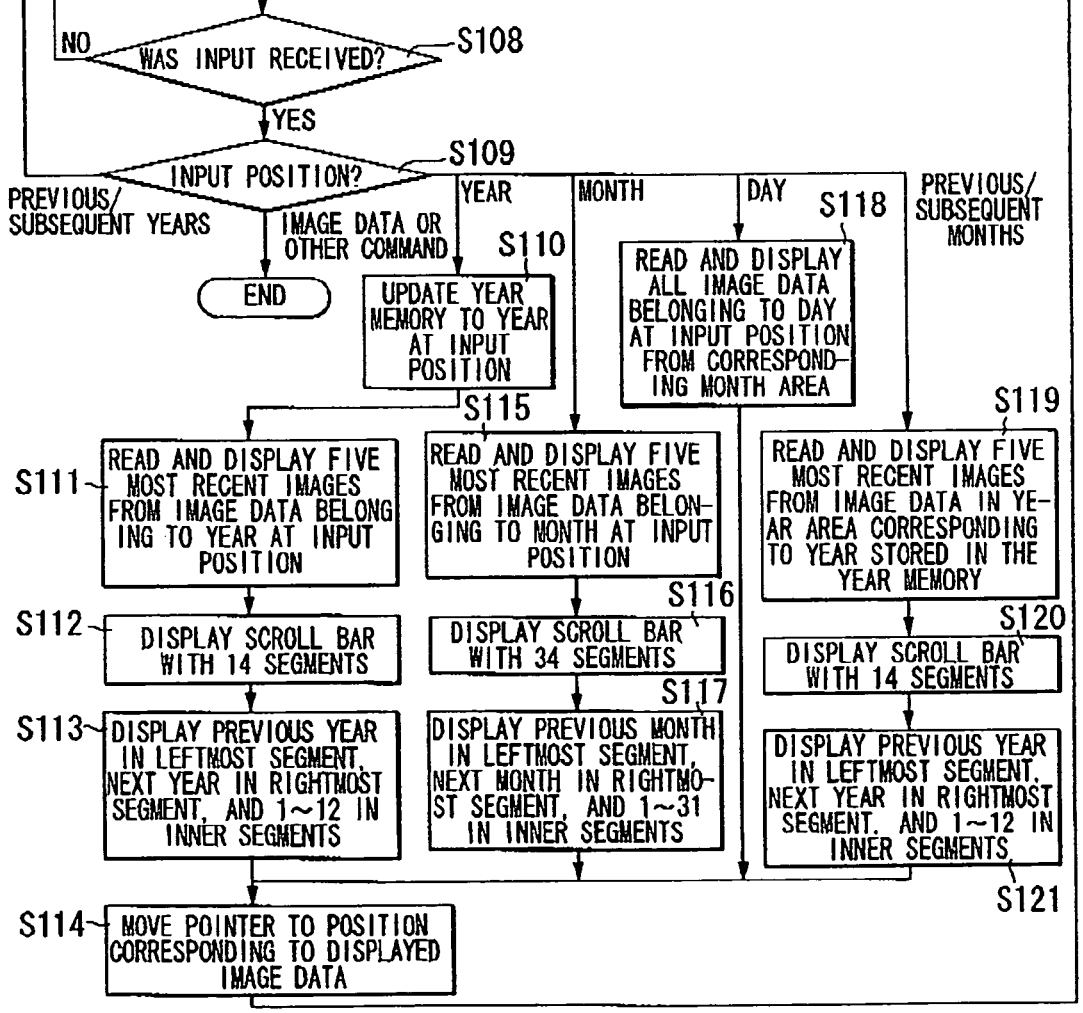
FIG. 12 is a flowchart illustrating steps in a display selection process executed by the CPU of the multifunction device according to the second embodiment.

FIG. 12 is a flowchart illustrating steps in a display selection process according to the second embodiment. FIG. 13 shows the display screen on the LCD 41 when the CPU 21 executes the display selection process of the second embodiment. Next, the display selection process according to the second embodiment in FIG. 12 will be described while referring also to FIG. 13.

As in the first embodiment described above, the display selection process according to the second embodiment begins when image data is inputted into the multifunction device 1 from external media or the like. In S101 of this process, the CPU 21 reorders the inputted image data by date based on the date data included with the image data. In S102 the CPU 21 allocates year areas 23a1 in the input image memory area 23a for the number of years to which the inputted image data belongs (years indicated in the date data). In S103 the CPU 21 writes the image data reordered in S101 to the corresponding month area 23a2 in the corresponding year area 23a1 based on the date data. Since twelve month areas 23a2 are provided in each year area 23a1, the CPU 21 writes image data to the corresponding month area 23a2 based on the date data included with the image data.

In S104 the CPU 21 outputs a scroll bar to the LCD 41 having segments corresponding to each of the years to which the image data belongs. In S105 the CPU 21 displays the year in each segment of the scroll bar in increasing order from left to right and displays the number of images for each year (the count of the year memory area 23h stored in a storage area of the RAM 23 corresponding to the year) in the corresponding segment. In S106 the CPU 21 displays the pointer P on the right edge of the scroll bar. In S107 the CPU 21 extracts five images from the most recent image data based on the date data and displays these images on the LCD 41.

Figure 13A:
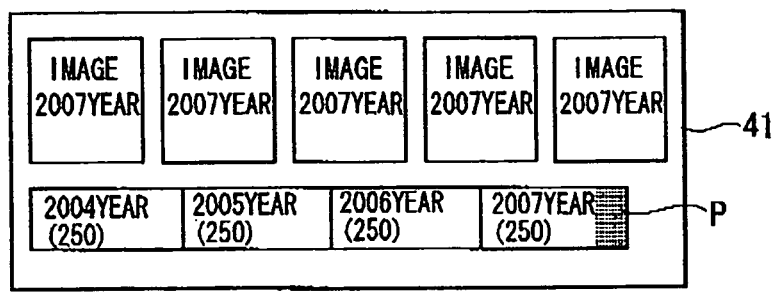
FIG. 13A, FIG. 13B, and FIG. 13C are explanatory diagrams showing the display screen on an LCD during execution of the display selection process according to the second embodiment.

FIG. 13(a) shows the display on the LCD 41 after executing the processes in S104-S107 described above. Since the inputted image data in this example has date data spanning the years 2004-2007, the scroll bar displayed on the LCD 41 in FIG. 13(a) has four segments for 2004, 2005, 2006, and 2007. The number of images belonging to each year is displayed in parentheses in the corresponding segment. In this example, there are 250 images for each year. Further, since the most recent image data is dated in 2007, five images with the most recent dates are displayed above the scroll bar.

In S108 the CPU 21 determines whether input has been received and continues to wait for input while none has been received (S108: NO). When input has been received (S108: YES), in S109 the CPU 21 determines the input position. The CPU 21 ends the display selection process if the input position corresponds to an image displayed on the LCD 41 or if another input operation excluding input on the scroll bar has been received (such as a cancel command inputted through a prescribed operation on the operating keys 40; S109: image or other input).

If the input position corresponds to one of the segments in the bar in which a year is displayed (S109: year), in S110 the CPU 21 writes the year displayed in the segment at the input position to the year memory area 23h. In S111 the CPU 21 updates the display by reading five images having the most recent date data from the year area 23a1 corresponding to the year displayed at the input position and displays these images on the LCD 41. In other words, when the user touches a segment in which a year is displayed, the CPU 21 recognizes this operation as a request to display the image data belonging to the corresponding year. In S112 the CPU 21 displays a scroll bar on the LCD 41 formed of fourteen segments, including segments corresponding to each of the twelve months, enabling the user to select image data for any month of the requested year.

In S113 the CPU 21 displays the previous year in the leftmost segment of the scroll bar indicating images up to the year prior to the selected year (the year stored in the year memory area 23h), displays the next year in the rightmost segment of the scroll bar indicating images belonging to years following the selected year, and displays the numbers 1-12 in the twelve inner segments representing the months from January to December. In S114 the CPU 21 changes the position of the pointer P to a position corresponding to the month to which the currently displayed image data belongs. After completing the process in S114, the CPU 21 returns to S108 and waits for new input.

Figure 13B:
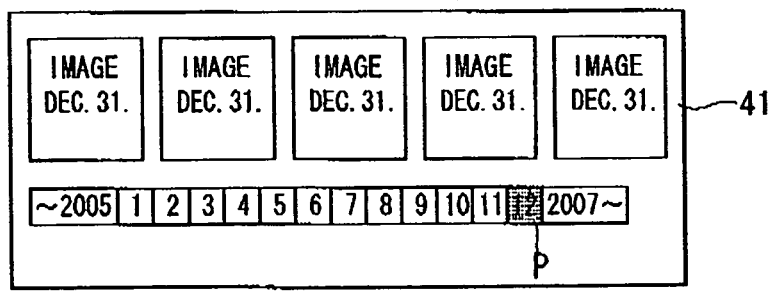

FIG. 13(b) shows the scroll bar formed of fourteen segments displayed after performing the process in S111-S114. The example in FIG. 13(b) shows the case in which the user has selected 2006 in FIG. 13(a).

As shown in FIG. 13(b), the scroll bar is formed of segments corresponding to the months January through December, and a number is displayed in each segment to represent the corresponding month. Further, a segment corresponding to years prior to the selected year is included in the leftmost end of the scroll bar, and the year "~2005" is displayed in this segment. Similarly, another segment is provided on the rightmost end of the scroll bar, and the year "2007~" indicating years following the selected year is displayed in this segment. Further, five images from image data belonging to the selected year (the year stored in the year memory area 23h) and having the most recent date data are displayed above the scroll bar. In the example of FIG. 13(b), image data for Dec. 31, 2006 is displayed above the scroll bar. Accordingly, the pointer P is positioned in the segment marked "12" in the scroll bar.

If the CPU 21 determines in S109 that the input position corresponds to a segment displaying a month (S109: month), in S115 the CPU 21 reads five images from the image data stored in the month area 23a2 corresponding to the month at the input position in the year area 23a1 for the selected year and displays these images on the LCD 41. Since the input position can only correspond to a month after the user has already specified a year, in this case the user has performed an input operation (touched) a month in the display on the LCD 41 when the LCD 41 has the display shown in FIG. 13(b). In other words, the CPU 21 assumes that the user has selected a desired month. Accordingly, in S116 the CPU 21 updates the previous display of the scroll bar by outputting a scroll bar to the LCD 41 having 34 segments by which the user can select image data for each day within the selected month. In S117 the CPU 21 displays the previous month in the leftmost segment of the scroll bar indicating months prior to the selected month (the month at the input position), the next month in the rightmost segment indicating months following the selected month, and the numbers 1-31 in all inner segments of the scroll bar excluding the leftmost and rightmost segments representing the $1^{st}$ through $31^{st}$ days. Subsequently, the CPU 21 advances to S114. In this way, the CPU 21 outputs the display shown in FIG. 13(c) to the LCD 41.

Figure 13C:
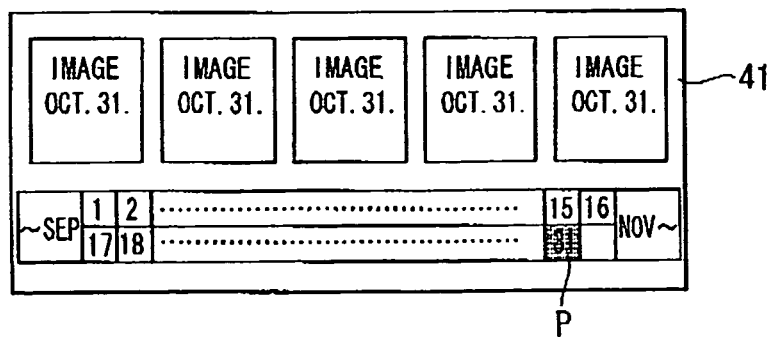

FIG. 13(c) shows the display on the LCD 41 after the user performed an input operation on the segment "10" corresponding to October in the display of FIG. 13(b). Here, "~Sept." is displayed in the leftmost segment of the scroll bar to indicate previous months, and "Nov.~" is displayed in the rightmost segment of the scroll bar to indicate subsequent months. Further, the numbers 1-31 are displayed in the inners segments to indicate days of the month. The most recent images for October 31$^{st}$ among the October image data are displayed above the scroll bar, and the pointer P is positioned in the "31" segment of the scroll bar.

Further, if the CPU 21 determines in S109 that the input position corresponds to a day segment (S109: day), indicating that the user has pressed on a segment for one of the days provided in the scroll bar of the display shown in FIG. 13(c), in S118 the CPU 21 reads all image data belonging to the day displayed at the input position from the corresponding month area 23a2 and displays this image data on the LCD 41. Subsequently, the CPU 21 advances to S108 via S114.

If the CPU 21 determines in S109 that the input position corresponds to one of the segments indicating the previous months or the subsequent months (S109: previous/subsequent months), then the CPU 21 can determine that the screen shown in FIG. 13(c) is displayed on the LCD 41 and the user has requested to display image data of the same year but of a month different from the currently displayed month. Therefore, in S119 the CPU 21 reads five images having the most recent date data from the year area 23a1 corresponding to the year stored in the year memory area 23h and displays this image data on the LCD 41. In S120 the CPU 21 displays the scroll bar shown in FIG. 13(b) having fourteen segments for selecting image data of a desired month to update the display on the LCD 41.

In S121 the CPU 21 displays the previous year in the leftmost segment of the scroll bar to indicate years prior to the selected year, the next year in the rightmost segment of the scroll bar to indicate years following the selected year, and the numbers 1-12 in the inner twelve segments to indicate the months January-December, and subsequently advances to S114. Accordingly, the CPU 21 switches the display on the LCD 41 to the preceding screen, enabling the user to specify image data for a different month. From this screen, the user can also return to the initial screen in FIG. 13(a) by pressing one of the segments for the previous year or following year.

Specifically, if the CPU 21 determines in S109 that the input position corresponds to a segment displaying the previous year or the following year (S109: previous/subsequent years), the CPU 21 returns to S104. As a result, the process in S104-S107 is repeated, displaying the initial screen shown in FIG. 13(a). Accordingly, the user can specify a new year for displaying image data and can select the subsequently displayed image data for the selected year.

According to the second embodiment described above, the multifunction device 1 can arrange inputted image data hierarchically based on the date data, enabling the user to select image data based on this hierarchy, i.e., based on the criteria year, month, and day. Hence, when the user is searching for desired image data from an entire set of inputted image data, the multifunction device 1 of the preferred embodiment enables the user to find data easily and intuitively, thereby improving the user-friendliness for selecting image data. As a result, the user can retrieve desired image data quickly and efficiently.

With the image processor having this construction, input position is determined in step S108 when input is received in step S109. Since groups of date data arranged in a hierarchy in steps S110 to S121 is associated to each segment in the array in step S102, if the input position detected in S109 corresponds to the array, the image processor can display on the LCD 41 images belonging to the group associated with the segment in which the input position lies (images selected in S109. Hence, when the user selects a desired image from the group of images through an input operation on the array, the image processor can display the desired image on the display screen, enabling desired images to be directly extracted from the group of images.

Accordingly, the user need not perform scrolling operations according to a common scroll bar device to repeatedly scroll the images sequentially until the desired image is displayed. When sequentially scrolling images through such scrolling operations, the images must be continuously read from the input image memory area 23a and displayed on the LCD 41, requiring a large amount of processing time since images contain a large amount of data. However, the device according to the second embodiment enables the user to find the desired image without performing scrolling operations, thereby greatly reducing the time required for the user to find (extract) the desired image and reducing the amount of stress on the user when the user is waiting for images to be displayed.

An array corresponding to each hierarchical level and, when input is received in an array, an array having date data for the low-order hierarchical level of the group corresponding to the segment in which the input position lies are displayed in S117. Hence, a group can be specified through input in a segment of the array, and the range of date data can be narrowed from a high-order level to a low-order level of the group. Accordingly, the user can intuitively search for date data through the displayed array and can easily select desired date data to extract a desired image indicated by this date data from the group of images to be displayed on the LCD 41.

Further, since all date data identifying each image in the group of images stored in the RAM 23 are grouped in S117, all date data can be associated with the array, and this array at a size that fits within the LCD 41 is displayed in S104. Accordingly, when selecting a group to which desired date data belongs from the array for each hierarchical level, the user can select a group with date data corresponding to a desired image without having to switch the display screen. Accordingly, the user can efficiently extract a desired image from the group of images.

Next, a third embodiment of the present invention will be described with reference to FIG. 14. In the first embodiment described above, the multifunction device 1 assigns identification data (image numbers) to segments of the scroll bar and displays image data corresponding to identification data assigned to an input position at which input is generated on the scroll bar. In the third embodiment, the image data itself is assigned to segments of the scroll bar in place of the identification data, and reduced images of the image data appear on the displayed scroll bar. Accordingly, the image number memory area 23c is not provided in the RAM 23 in the third embodiment, and image data is stored in the input image memory area 23a in order of their image numbers, beginning from the top address in the input image memory area 23a. Further, the addresses in the input image memory area 23a are stored in a prescribed region of the RAM 23 in association with each segment (each position) of the scroll bar. In the following description, like parts and components to those in the first embodiment have been designated with the same reference numerals to avoid duplicating description.

In the third embodiment, the same display selection process as that described in the first embodiment shown in FIG. 5 is executed. The display selection process according to the third embodiment differs from that of the first embodiment in only the following points. The first difference in the third embodiment is that in S16 of the process shown in FIG. 5, the CPU 21 assigns the image data itself to segments of the scroll bar rather than the image numbers by writing each address in the input image memory area 23a at which image data corresponding to each segment is stored to the RAM 23.

Hence, when the CPU 21 determines in S21 that the input position corresponds to a point on the scroll bar excluding the pointer P, the CPU 21 recognizes that the user has specified one of the images within a segment of the scroll bar based on the ratio of the coordinates at the input position to the length of the segment.

The second difference in the third embodiment is that the minimum number of images assigned per segment to segments near the image corresponding to the input position is set to "6" rather than "10" in the first and second assigning processes of S23 and S24 executed when input is received on the scroll bar. After performing this process, a display screen such as that shown in FIG. 14 is outputted to the LCD 41 in the display selection process.

FIG. 14 shows the display screen outputted to the LCD 41 by the multifunction device 1 according to the third embodiment for enabling the user to select inputted image data. As described above, the display screen shown in FIG. 14 is displayed on the LCD 41 according to the same display selection process performed in the first embodiment. In the example shown in FIG. 14, the total number of inputted images is 1,000, and the number of segments provided in the scroll bar has been set to 10.

Figure 14A:
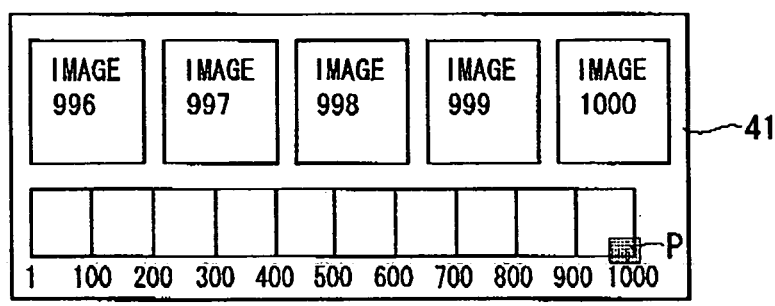
FIG. 14A and FIG. 14B are explanatory diagrams showing the display screen on the LCD for selecting image data loaded in a multifunction device according to a third embodiment.

FIG. 14(a) shows the initial screen displayed when image data is inputted into the multifunction device 1. As in the first embodiment described above, ten segments denoted segment A, segment B, ..., and segment J are provided in the scroll bar in order from left to right. One hundred images are assigned to each segment based on the order of image numbers included with the image data. Next, the image number 1 is displayed below the left edge of segment A to indicate that the left edge of segment A is the beginning side, and image numbers for the last image assigned to each segment (100, 200, ..., and 1000) are displayed below the right edge of each corresponding segment. In addition, the pointer P is displayed in the right edge of the scroll bar, and five images having the last five image numbers (images with numbers 996-1000) from among the image data stored in the input image memory area 23a are displayed above the scroll bar.

Figure 14B:
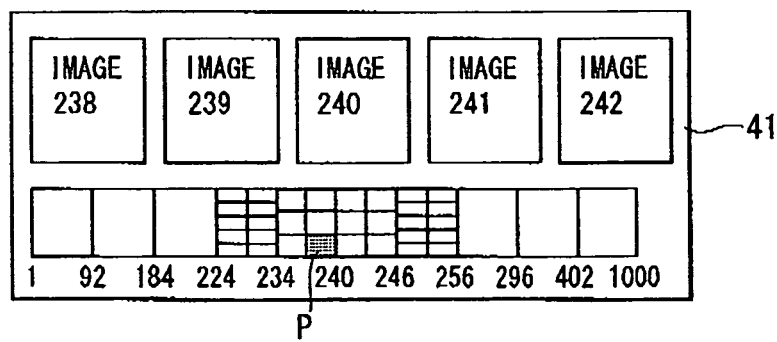

FIG. 14(b) shows the screen displayed on the LCD 41 when the user has pressed (performed an input operation on) an image having image number 240 in the display shown in FIG. 14(a). At this time, images around image number 240 are assigned to the center segments in the scroll bar. Specifically, six images having image numbers 235-240 are arranged in segment E, while six images having image numbers 241-246 are arranged in segment F. Based on the display selection process, ten images are assigned to each of segments D and G, and forty images are assigned to each of segments C and H. The remaining images at the beginning and ending sides are divided in half and assigned to segments A and B and segments I and J, respectively.

Since the image data itself can be assigned to the scroll bar in the third embodiment, the user can predict the location of desired image data based not only on the arrangement of the images according to the order of image numbers, but also on the color tones of the thumbnail images, and therefore can more easily select desired image data from a large number of images.

Since images in association with each position in the array are managed in S17, images including an image corresponding to an input position (images selected in step S21) can be displayed on the LCD 41 when the input in the array is received in S20. In other words, since images are managed in association with positions on the displayed array, when the user selects a desired image from the group of images only through an input operation on the array, the image processor can display the desired image on the display screen, thereby directly extracting the desired image from the group of images.

Further, S15 displays an array of a size that can fit within the LCD 41, and S16 assigns all images in the group of images to specification data specifying segments of the array based on the order of the image numbers. Accordingly, the user can specify all images in the group through the array displayed in one screen; i.e., there are no images that cannot be specified. As a result, the user can efficiently extract (display on the display screen) a desired image from among the group of images by performing an operation in one screen, without having to switch the display screen.

Further, while images are densely assigned within each segment when the group of images includes a large number of images, the number of assigned images within a segment including an image associated with a position received in S21 can be reduced from the number prior to receiving input, thereby expanding the range in the array occupied by a single image. Therefore, after the user performs at least one input operation in the array, the image processor according to the third embodiment prevents an input position of a subsequent user operation from greatly missing the assigned position of the desired image, enabling the user to accurately select the desired image.

In addition, since in step S16 images are assigned to specification data based on the order of image numbers, the images themselves can be displayed in segments of the array. In this way, the user can more clearly identify desired images based on the color tones of the displayed images and, hence, can more easily select a desired image from a large number of images.

Next, a fourth embodiment of the present invention will be described with reference to FIGS. 15 and 16. In the display selection process according to the first embodiment described above, the multifunction device 1 executes a process to select and display image data from among externally inputted data based on an input operation on the scroll bar. In contrast, in the display selection process according to the fourth embodiment, the multifunction device 1 can calibrate image data (create calibrated image data), store the pre-calibrated image data as history data, and enable the user to select and display image data from among the image data stored as history data by performing an input operation on the scroll bar.

Hence, rather than functioning to store all image data inputted into the multifunction device 1, the input image memory area 23a functions to store inputted image data specified by the user and calibration image data obtained by calibrating the specified image data. In the following description, like parts and components similar to those in the first embodiment have been designated with the same reference numerals to avoid duplicating description.

Figure 15:
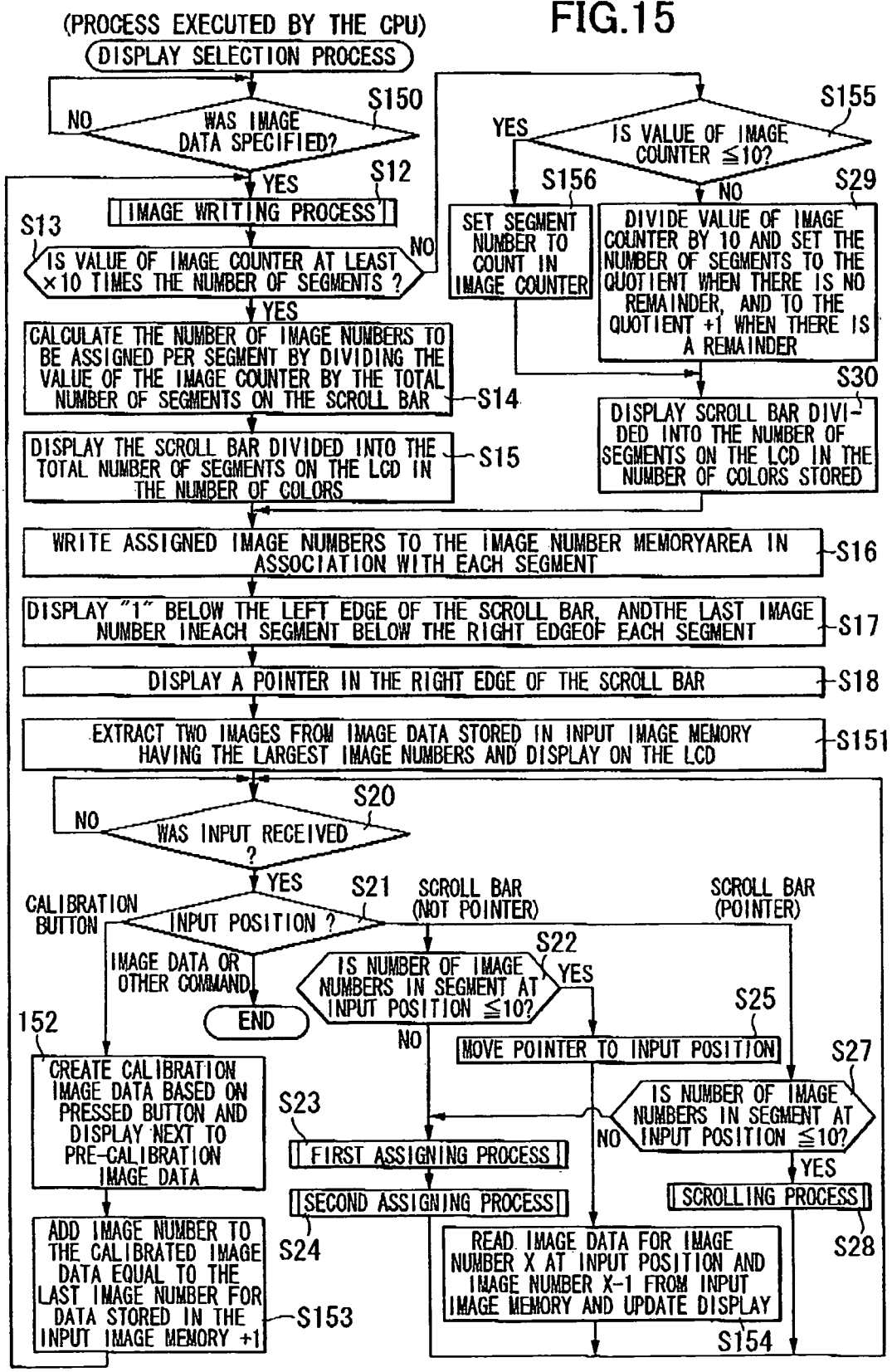
FIG. 15 is a flowchart illustrating steps in a display selection process according to a fourth embodiment.

FIG. 15 is a flowchart illustrating steps in the display selection process according to the fourth embodiment. FIG. 16 shows the screen displayed on the LCD 41 during the display selection process of the fourth embodiment. The display selection process according to the fourth embodiment will be described next while referring to FIGS. 15 and 16.

The display selection process according to the fourth embodiment begins when image data is inputted into the multifunction device 1 from external media or the like. In S150 at the beginning of this process, the CPU 21 determines whether one of the images in the inputted image data has been specified. The user specifies image data by performing an input operation on the LCD 41 and a prescribed operation on the operating keys 40.

In S12 the CPU 21 executes an image writing process to write this image data to the input image memory area 23a and to increment the count of the image counter 23f by 1 each time data for one image is written. Through the image writing process of S12 according to the fourth embodiment, one specified image is stored in the input image memory area 23a. In addition, an image number is added to the image data written to the input image memory area 23a beginning from 1 and increasing sequentially.

The process in S13-S18 is subsequently executed as described in the first embodiment. However, in the fourth embodiment the process of S151 is executed in place of the process in S19 of the first embodiment. While the process of S19 according to the first embodiment displays five images on the LCD 41, in the process of S151 according to the fourth embodiment, the CPU 21 displays two images on the LCD 41.

Through steps not shown in FIG. 15 performed after the process of S151 according to the fourth embodiment, the CPU 21 displays buttons on the LCD 41 for inputting various commands. These buttons include calibration buttons 200 for inputting commands to calibrate image data.

Figure 16A:
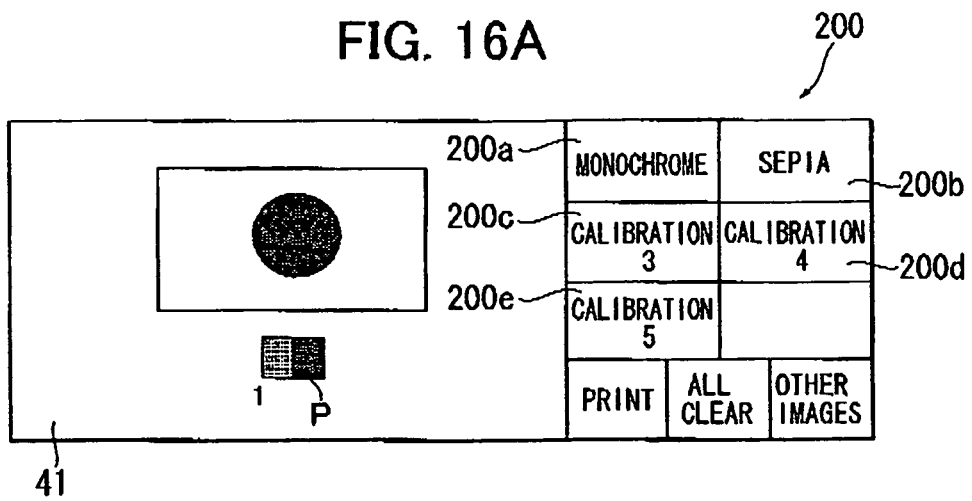
FIG. 16A, FIG. 16B and FIG. 16C are explanatory diagrams showing the display screen on the LCD during execution of the display selection process according to the fourth embodiment.

Through this process, a single image (original image data) specified from the inputted image data is displayed in the screen on the LCD 41, as shown in FIG. 16(a). A scroll bar having image numbers assigned to all image data stored in the input image memory area 23a is also displayed below the displayed image. The calibration buttons 200 are also displayed to the right of the image data in the display screen, enabling the user to execute various image processes on the selected image data.

The calibration buttons 200 are configured of a plurality of buttons including a Monochrome button 200a, a Sepia button 200b, a Calibration 3 button 200c, a Calibration 4 button 200d, and a Calibration 5 button 200e. The calibration buttons 200 enable the user to perform various calibrations on the selected image data (i.e., image data specified by the position of the pointer P in the scroll bar). When one of the calibration buttons 200 is pressed, a command corresponding to the pressed calibration button 200 is issued, and calibration indicated by the corresponding button 200a-200e is executed on the image data. For example, if the user presses the Monochrome button 200a, the multifunction device 1 converts the colors in the selected image data to monochrome. If the user presses the Sepia button 200b, the multifunction device 1 corrects the color tones in the selected image data to sepia tones. Input on one of the other buttons 200c-200e initiates another type of calibration, such as a process to modify the resolution, adjust the color density, or insert watermarks or text.

Next, if the CPU 21 determines in S20 that input has been received (S20: YES) and that the input position is not one of the calibration buttons 200 (S21: image data, other commands, scroll bar (not pointer P), or scroll bar (pointer P)), the CPU 21 executes the corresponding processes in S22-S28 described in the first embodiment to select image data to be displayed on the LCD 41 based on the input position.

In the fourth embodiment, the CPU 21 executes the process in S154 in place of the process of S26 described in the first embodiment. In S26 according to the first embodiment, the CPU 21 reads image data from the input image memory area 23a having image numbers X±2 based on the input position on the scroll bar and displays this image data. However, in S153 according to the fourth embodiment, the CPU 21 reads image data from the input image memory area 23a for image numbers X-(X−1) corresponding to the input position on the scroll bar and displays this image data.

However, if the CPU 21 determines in S21 that the input position corresponds to one of the calibration buttons 200 displayed on the LCD 41 (S21: calibration button), in S152 the CPU 21 creates calibration image data from the image data having the image number at the position of the pointer P based on the pressed calibration button 200, and displays the calibrated image data along with the pre-calibrated image data. Since a maximum of two images can be displayed on the LCD 41 in the fourth embodiment, if two images were displayed prior to creating the calibration data, the CPU 21 removes image data having the oldest history from the screen. In S153 the CPU 21 adds an image number obtained by incrementing the last image number for image data stored in the input image memory area 23a by 1 to the calibrated image data created in S151, and subsequently returns to S12. Accordingly, in the image writing process of S12 the CPU 21 writes the calibrated image data created in S151 to the input image memory area 23a, thereby preserving the pre-calibrated image data in the input image memory area 23a as history data, with image numbers included in the image data serving to indicate the historical order of the images.

Figure 16B:
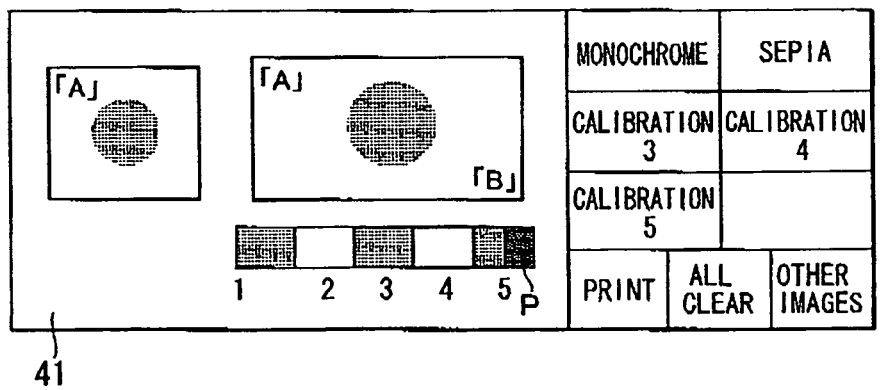

After completing the image writing process of S12, the CPU 21 redisplays the scroll bar in the process beginning from S13. As a result, a display screen such as that shown in FIG. 16(b) is displayed on the LCD 41.

On the other hand, if the CPU 21 determines in S13 that the count value of the image counter 23f is less than ten times the number of segments stored in the segment number memory area 23e (total number of segments on the scroll bar; S13: NO), in S155 the CPU 21 determines whether the count value of the image counter 23f (i.e., the number of images stored in the input image memory area 23a) is ten or less.

If the count value of the image counter 23f exceeds ten (S155: NO), then the CPU 21 executes the processes in S29 and S30 as described in the first embodiment to display the scroll bar having a pattern corresponding to the number of images, and advances to S16. When performing the process in S16 after executing the process in S29, the CPU 21 assigns ten image numbers per segment to each segment of the scroll bar beginning from segment A, as described in the first embodiment.

However, if the CPU 21 determines in S155 that the count value of the image counter 23f is ten or less (S155: YES), then in S156 the CPU 21 sets the number of segments in the scroll bar to the count value of the image counter 23f (number of images stored in the input image memory area 23a). Consequently, each segment of the scroll bar corresponds to one image (one image number). Subsequently, the CPU 21 advances to S16 via S30. When performing the process in S16 after executing the process in S156, the CPU 21 assigns one image number per segment to segments of the scroll bar beginning from segment A.

Since a maximum of two images can be displayed at one time in the fourth embodiment, the scrolling process of S28 serves to scroll images two at a time in the indicated direction.

FIG. 16(b) shows the case in which calibration has been executed four times on the original image data shown in FIG.

16(a). Accordingly, the scroll bar is provided with five segments corresponding to the current image and the past four images. In the display screen shown in FIG. 16(b), the current image (the image data that has been calibrated four times and has image number 5) is displayed in the right side of the screen. The latest image data was created by first calibrating the original image data to change the color tones to sepia tones, subsequently inserting the text "A" in the upper left of the image, and finally inserting the text "B" in the lower right of the image. The image displayed to the left of the most recent image indicates the image data prior to performing the last calibration (image data having image number 4) before the text "B" was inserted into the image.

Since each segment of the scroll bar corresponds to an image number and past calibrated image data indicated by the image numbers is preserved in the input image memory area 23a as history data, the user can perform an input operation on the scroll bar to specify image data at any desired stage of calibration from among the image data stored as history data.

Figure 16C:
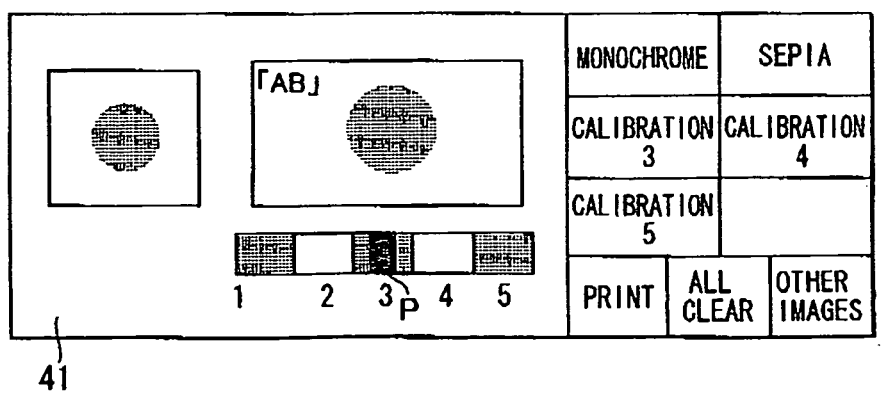

If the user touches (specifies) the segment of the scroll bar having image number 3 (segment C) in the display shown in FIG. 16(b), the display changes to that shown in FIG. 16(c). The display of FIG. 16(c) includes the image existing prior to the last two calibrations and having image number 3 and, to the left of this image, the image existing one more calibration before the image having image number 3 (i.e., image data having image number 2).

In other words, the display of FIG. 16(c) shows an image obtained by modifying the original image data of FIG. 16(a) in the first calibration to convert color tones to sepia tones, and the image obtained through the second calibration to insert the text "A".

At this time, the user can perform a desired calibration using one of the calibration buttons 200 on the currently selected image data displayed in the display screen, i.e., the image data having image number 3 produced through the first two calibration processes. In other words, the user can go back to past image data at a specific stage of calibration to create calibration image data from this past data.

In this way, the multifunction device 1 according to the fourth embodiment can preserve the calibration history of image data, enabling the user to select past image data at a specific stage of calibration through a single input operation of touching the scroll bar in the screen. Hence, the user can easily read desired image data from the history data and can efficiently recalibrate this image data.

While the invention has been described in detail with reference to specific embodiments thereof, it would be apparent to those skilled in the art that many modifications and variations may be made therein without departing from the spirit of the invention, the scope of which is defined by the attached claims.

For example, the multifunction device 1 according to the first, second, and fourth embodiments described above is configured to display a single scroll bar on the LCD 41 with a pattern formed by assigning identification data sequentially along the width dimension, while the multifunction device 1 according to the third embodiment also displays a single scroll bar. However, the multifunction device 1 may be configured to display a plurality of scroll bars. This configuration can reduce the number of image data or identification data assigned per segment, even when a large amount of image data is provided for selection, reducing the distance by which the user misses the desired data when touching the scroll bar.

Further, while the scroll bar outputted to the LCD 41 in the display selection process is arranged in a straight line in the preferred embodiments described above, it is not essential that the scroll bar be arranged in a straight line. For example, the scroll bar may be configured in a spiral shape or curved shape to follow the shape of the screen. Accordingly, the overall length of the scroll bar can be increased over that having a linear shape, thereby increasing the size of each segment and reducing the number of data assigned per unit length. As a result, the user can more precisely target desired data when touching the scroll bar.

In the preferred embodiments described above, only one scroll bar is displayed on the LCD 41 at all times. However, a separate scroll bar may be formed when the user performs an input operation on the scroll bar to display a prescribed range of data including the data at the input position. The scroll bar can be displayed on the LCD 41 together with the original scroll bar.

In the preferred embodiments described above, when the user touches the scroll bar, the multifunction device 1 modifies the scroll bar on the LCD 41 to reduce the number of image data or identification data assigned per segment near the input position. Here, the number of data assigned per segment is arbitrary and not limited to the examples in the preferred embodiments.

In the preferred embodiments described above, image numbers or date data is used as identification data, and the multifunction device 1 assigns this identification data in order from one end of the scroll bar to the other based on a certain rule, such as the order of image numbers or the sequence of dates. However, the identification data assigned to the scroll bar is not limited to these examples and may be a filename or the like of the image data assigned to the scroll bar in alphabetical order, for example.

In the preferred embodiments described above, the multifunction device 1 is provided with an input device configured of the touch panel 100 to receive input on the scroll bar. However, it is also possible to perform an input operation by outputting a cursor to the LCD 41 and enabling the user to perform cursor movements using a mouse or other pointing device.

In the first and fourth embodiments described above, identification data (image numbers) for images is assigned to segments of the scroll bar. Upon detecting input on the scroll bar, the multifunction device 1 extracts image data from the input image memory area 23a based on the identification data assigned at the input position. However, it is also possible to store image data in the input image memory area 23a beginning from the top address therein based on the order of identification data and to manage each segment of the scroll bar in association with an address in the input image memory area 23a, i.e., to directly associate image data with positions on the scroll bar without using the identification data. With this configuration, the multifunction device 1 can extract image data associated with an input position on the scroll bar from the input image memory area 23a.

The processes that the user can perform on selected image data are not particularly limited to the examples in the preferred embodiment, but may be processes for printing the image data on the printer 2 of the multifunction device 1, transmitting the image data by facsimile, transmitting the image data to a PC or network, or the like.

Further, the multifunction device 1 according to the first through third embodiments may also be configured to perform calibration processes on selected image data, as described in the fourth embodiment, and may also print, transmit via fax, or output to a network the calibrated image data.

What is claimed is:

1. An image processor comprising:
    an image display controlling portion configured to display images on a display screen;
    an image storing portion configured to store a set of images to be displayed on the display screen;
    a selecting portion configured to select the images displayed on the display screen;
    an input receiving portion configured to receive input on the display screen;
    an array display controlling portion configured to display an array on the display screen, the array being of a size that fits within the display screen and comprising a plurality of segments including a first segment nearest one end of the array and an nth segment nearest the opposite end of the array, with the plurality of segments arranged sequentially from the first segment to the nth segment;
    a first assigning portion configured to assign identification data identifying each image in the set of images stored in the image storing portion to specification data specifying each segment of the array displayed by the array display controlling portion based on the order of the identification data;
    an identification data managing portion configured to manage identification data assigned to specification data by the first assigning portion in association with positions in the array; and
    an input position determining portion configured to determine the position of input in the array when the input receiving portion receives input;
    wherein the image display controlling portion displays on the display screen an image identified by identification data managed by the identification data managing portion in correspondence with the position determined by the input position determining portion, as the images selected by the selecting portion when the input receiving portion receives input;
    wherein the first assigning portion comprises a reduction part and an increase part, upon receipt of input by the input receiving portion, the reduction part reducing the number of identification data assigned to the segment including identification data managed by the identification data managing portion in correspondence with the position determined by the input position determining portion from the number prior to the receipt of the input by the input receiving portion and the increase part increasing the number of assigned identification data from the number assigned prior to the receipt of the input with respect to segments other than the segment for which the number of assigned identification data was reduced; and
    wherein the first assigning portion further comprises an input receiving part configured to receive the input by the input receiving portion, the reduction part being adjacent to the input receiving part and the increase part being away from the input receiving part.

2. The image processor according to claim 1, further comprising an identification data displaying portion that displays at least identification data at the beginning or the end of the group stored in the image storing portion at a position corresponding to one or the other end of the array displayed on the display screen, when the identification data for the group of images stored in the image storing portion is arranged in sequence.

3. The image processor according to claim 1, wherein the array display controlling portion outputs an array to the display screen in a form of a single pattern extending linearly from one end to another end.

4. The image processor according to claim 1, further comprising an inputting portion configured of a touch panel being superimposed over the display screen, the input receiving portion receiving an input from the inputting portion.

5. The image processor according to claim 1, wherein the image display controlling portion comprises correction part that corrects an image displayed on the display screen upon receipt of an input by the input receiving portion, the set of images being a set of corrected images corrected by the correction part.

6. An image processor comprising:
    an image display controlling portion configured to display images on a display screen;
    an image storing portion configured to store a set of images to be displayed on the display screen;
    a selecting portion configured to select the images displayed on the display screen;
    an input receiving portion configured to receive input on the display screen;
    an array display controlling portion configured to display an array on the display screen, the array being of a size that fits within the display screen and comprising a plurality of segments including a first segment nearest one end of the array and an nth segment nearest the opposite end of the array, with the plurality of segments arranged sequentially from the first segment to the nth segment;
    a second assigning portion configured to assign each image in the set of images stored in the image storing portion to a segment of the array displayed by the array display controlling portion based on the order of identification data for each image; and,
    an image managing portion configured to manage images assigned to each segment by the second assigning portion for each image in the array;
    wherein the image display controlling portion displays, upon receipt of input by the input receiving portion, on the display screen, images including an image managed by the image managing portion in association with the input position as the image selected by the selecting portion;
    an input position determining portion that determines the position of input in the array when the input receiving portion receives input;
    wherein the second assigning portion comprises a reduction part and an increase part, upon receiving an input by the input receiving portion, the reduction part reducing the number of images assigned to the segment including the image managed by the image managing portion in association with the position determined by the input position determining portion to a number less than the number of images prior to the receipt of the input by the input receiving portion, and the increase part increasing the number of assigned identification data from the number assigned prior to the receipt of the input with respect to segments other than the segment for which the number of assigned identification data was reduced; and
    wherein the first assigning portion further comprises an input receiving part configured to receive the input by the input receiving portion, the reduction part being adjacent to the input receiving part and the increase part being away from the input receiving part.

7. The image processor according to claim 6, wherein the array display controlling portion outputs an array to the display screen in a form of a single pattern extending linearly from one end to another end.

8. The image processor according to claim 6, further comprising an inputting portion configured of a touch panel being superimposed over the display screen, the input receiving portion receiving an input from the inputting portion.

* * * * *